United States Patent
Tonkovich et al.

(10) Patent No.: US 8,221,528 B2
(45) Date of Patent: Jul. 17, 2012

(54) METHODS FOR APPLYING MICROCHANNELS TO SEPARATE GASES USING LIQUID ABSORBENTS, ESPECIALLY IONIC LIQUID (IL) ABSORBENTS

(75) Inventors: Anna Lee Y. Tonkovich, Dublin, OH (US); Robert D. Litt, Westerville, OH (US); Ravi Arora, New Albany, OH (US); Qiu Dongming, Dublin, OH (US); Micheal Jay Lamont, Plain City, OH (US); Maddalena Fanelli, Plain City, OH (US); Wayne W. Simmons, Plain City, OH (US); Laura J. Silva, Plain City, OH (US); Steven Perry, Galloway, OH (US)

(73) Assignee: Velocys, Inc., Plain City, OH (US)

(*) Notice: Subject to any disclaimer, the term of this patent is extended or adjusted under 35 U.S.C. 154(b) by 666 days.

(21) Appl. No.: 12/184,877

(22) Filed: Aug. 1, 2008

(65) Prior Publication Data
US 2010/0024645 A1    Feb. 4, 2010

(51) Int. Cl.
*B01D 53/14* (2006.01)
(52) U.S. Cl. .......................... 95/232; 95/236
(58) Field of Classification Search ............ 95/154, 95/156, 172, 178, 185; 96/243; 422/99, 422/169
See application file for complete search history.

(56) References Cited

U.S. PATENT DOCUMENTS

| | | | |
|---|---|---|---|
| 5,451,249 A * | 9/1995 | Spiegel et al. .................. 95/117 |
| 5,504,968 A * | 4/1996 | Pressley .......................... 15/302 |
| 6,720,359 B2 * | 4/2004 | O'Rear et al. ................ 518/702 |
| 7,125,540 B1 * | 10/2006 | Wegeng et al. ................ 423/650 |
| 7,250,074 B2 * | 7/2007 | Tonkovich et al. ............. 95/130 |
| 2003/0221554 A1 | 12/2003 | TeGrotenhuis et al. |
| 2005/0045030 A1 * | 3/2005 | Tonkovich et al. ............... 95/90 |
| 2005/0265915 A1 | 12/2005 | Tonkovich et al. |
| 2006/0251558 A1 | 11/2006 | Chinn et al. |
| 2007/0161095 A1 | 7/2007 | Gurin |
| 2009/0018348 A1 | 1/2009 | Zahn et al. |
| 2009/0035872 A1 * | 2/2009 | Feldstein ....................... 436/164 |
| 2009/0043141 A1 * | 2/2009 | Mazanec et al. .............. 585/310 |

FOREIGN PATENT DOCUMENTS

| | | |
|---|---|---|
| CA | 2 647 263 | 10/2007 |
| EP | 08 79 5001 | 4/2011 |
| WO | WO 2005-105665 | 11/2005 |
| WO | WO 2006/010068 | 1/2006 |
| WO | PCT/US08/09352 | 8/2008 |
| WO | WO 2009/018348 | 2/2009 |
| WO | PCT/US08/09352 | 4/2010 |

OTHER PUBLICATIONS

Staudinger, et al., A critical compilation of Henry's law constant temperature dependence relations for organic compounds in dilute aqueous solutions, Chemosphere, Aug. 2001, pp. 561-576, retrieved from http://www.sciencedirect.com, Dec. 12, 2008.

* cited by examiner

*Primary Examiner* — Duane Smith
*Assistant Examiner* — Ives Wu
(74) *Attorney, Agent, or Firm* — Taft Stettinius & Hollister LLP

(57) ABSTRACT

Methods of using microchannel separation systems including absorbents to improve thermal efficiency and reduce parasitic power loss. Energy is typically added to desorb a solute and then energy or heat is removed to absorb a solute using a working solution. The working solution or absorbent may comprise an ionic liquid, or other fluids that demonstrate a difference in affinity between a solute and other gases in a solution.

11 Claims, 27 Drawing Sheets

METHODS FOR APPLYING MICROCHANNELS TO SEPARATE GASES USING LIQUID ABSORBENTS, ESPECIALLY IONIC LIQUID (IL) ABSORBENTS

CROSS REFERENCE TO RELATED APPLICATION

This application claims the benefit of U.S. Provisional Application No. 60/962,784, filed Aug. 1, 2007, which is incorporated by reference.

BACKGROUND OF THE INVENTION

The present invention relates to methods of separating gases and, more particularly to the methods of separating gases using microchannel devices and ionic liquid absorbents.

The Losey paper describes a contacting method for a gas and a liquid reaction system but does not suggest absorption-desorption as a potential unit operation. Matthew W. Losey et al, "Microfabricated Multiphase Packed-Bed Reactors: Characterization of Mass Transfer and Reactions," Ind. Eng. Chem. Res. 2001, 40, 2555-2562. "Solubilities and Thermodynamic Properties of Gases in the Ionic Liquid 1-n-Butyl-3-methylimidazolium Hexafluorophosphate", Anthony, J., Maginn, E., and Brennecke, J., J. Phys. Chem B 2002, 106, 7315-7320, describes one example of an ionic liquid that suggests a single stage separation of methane and nitrogen are possible. Both of these articles are incorporated by reference.

The use of wicks or capillary structures for thin film is described in U.S. Pat. Nos. 7,051,540 and 6,875,247, which are incorporated by reference. Surface features for multiphase processing are discussed in U.S. Patent Application Publication Nos. 2007/0085227, 2007/0017633, and 2006/0073080, which are incorporated by reference.

Gas separations are discussed in U.S. Pat. Nos. 6,579,343 and 6,623,659, U.S. Patent Application Publication No. 2006/0251558, and PCT Published Application No. WO 02/34863, which are incorporated by reference.

Options for the absorption and desorption of $SO_2$ from flue gas independently or in conjunction with $CO_2$ absorption and desorption have been considered by a few researchers (Wu, W., Han, B., Gao, H., Liu, Z., Jiang, T., Huang, J., "Desulfurization of flue gas: $SO_2$ absorption by an ionic liquid," Angew. Chem. Int. Ed., vol. 43, pp. 2415-2417, 2004; Anderson, J. L., Dixon, J. K, Maginn, E. J., Brennecke, J. F., "Measurement of $SO_2$ solubility in ionic liquids," The Journal of Physical Chemistry B, vol. 110, no. 31, pp. 15059-15062, 2006, each of which is incorporated by reference). Problems with typical wet and dry absorption techniques, including large water requirements and post-absorption treatment, dust formation and sorbent poisoning, plugging, or deactivation have led to consideration of ionic liquids as potential sorbents.

Foam flow is discussed in Stemmet, C. P., Jongmans, J. N., van der Schaaf, J., Kuster, B. F. M., Schouten, J. C., "Hydrodynamics of gas-liquid counter-current flow in solid foam packings," Chemical Engineering Science, 60, 6422-6429, 2005; Stemmet, C. P., van der Schaaf, J., Kuster, B. F. M., Schouten, J. C., "Solid Foam Packings for Multiphase Reactors—Modeling of Liquid Holdup and Mass Transfer," Trans. ChemE, Part A, Chemical Engineering Research and Design, 84 (A12), 1134-1141, 2006; and Stemmet, C. P., Meeuwse, M., van der Schaaf, J., Kuster, B. F. M., Schouten, J. C., "Gas-liquid mass transfer and axial dispersion in solid foam packings," Chemical Engineering Science, 62, 5444-5450, 2007. The aforementioned references are incorporated herein by reference.

INTRODUCTION TO THE INVENTION

Embodiments of the present invention include methods of using microchannel separation systems including absorbents to improve thermal efficiency and reduce parasitic power loss. Energy is typically added to desorb a solute and then energy or heat is removed to absorb a solute using a working solution. The working solution or absorbent may comprise an ionic liquid, or other fluids that demonstrate a difference in affinity between a solute and other gases in a solution.

The application of microchannel separation systems using absorbents represents an opportunity for improved efficiency by integrating a complete system to improve thermal efficiency and reduce parasitic power loss. Energy is typically added to desorb the solute and then removed to absorb the solute using the working solution. The working solution or absorbent may comprise an ionic liquid, an amine solution for primarily carbon dioxide or H2S separation, or other fluids that demonstrate a difference in affinity between two or more solutes in a solution.

An ionic liquid is one absorbent option of a liquid that comprises primarily ions, although may also contain some water or other solvent. Ionic liquids have a relatively low (below 100° C.) melting point and are typically liquid at room temperature.

In a first aspect, a method for separating gaseous components according to the present invention may include contacting a gaseous mixture with an ionic liquid by flowing the gaseous mixture and the ionic liquid through a microchannel; absorbing at least a portion of a first component gas of the gaseous mixture by the ionic liquid, thereby creating a resultant mixture including a resultant gas and the ionic liquid; directing the resultant gas away from the ionic liquid; and desorbing at least a portion of the first component gas from the ionic liquid by changing the temperature of the ionic liquid.

In a detailed embodiment of the first aspect, the step of desorbing at least a portion of the first component gas may include raising the temperature of the ionic liquid. In another detailed embodiment of the first aspect, the step of desorbing at least a portion of the first component gas may include lowering the temperature of the ionic liquid. In yet another detailed embodiment of the first aspect, the step of desorbing at least a portion of the first component gas includes lowering the pressure of the ionic liquid. In still another detailed embodiment of the first aspect, the method may include the step of changing the temperature of the ionic liquid prior to the step of absorbing at least a portion of the first component gas.

In another detailed embodiment of the first aspect, the step of desorbing at least a portion of the first component gas may include raising the pressure of the ionic liquid. In a further detailed embodiment, the step of changing the temperature of the ionic liquid may include lowering the temperature of the ionic liquid. In another further detailed embodiment, the step of changing the temperature of the ionic liquid may include raising the temperature of the ionic liquid. In still another further detailed embodiment, thermal energy extracted from the ionic liquid in one of the desorbing and changing the temperature steps may be supplied to the ionic liquid in the other of the desorbing and changing the temperature steps.

In another detailed embodiment of the first aspect, the microchannel may include at least one flow mixing feature. In a further detailed embodiment, the flow mixing feature may include a porous packed bed including at least one of rings and spheres. In another further detailed embodiment, the flow mixing feature may include a porous foam, felt, wad and/or other porous structure continuous for at least a length greater than a length of three hydraulic diameters of the microchannel, wherein the porosity is less than one. In another exemplary embodiment, the chamber that houses the foam structure may range from 2 mm to 50 mm, for example, and a microchannel dimension may be found elsewhere in the process, including integrated heat or mass exchangers or mixers. In an alternate embodiment, the effluent from a large absorption section may feed to two or more channels downstream, wherein the channels are in the microchannel dimension and wherein the channels are used for heat or mass exchange or mixing.

In another detailed embodiment of the first aspect, the contacting step may include flowing the gaseous mixture and the ionic liquid co-currently through the microchannel. In yet another detailed embodiment of the first aspect, the contacting step may include flowing the gaseous mixture counter-currently to the ionic liquid through the microchannel.

In still another detailed embodiment of the first aspect, the microchannel may include a a foam, wad, and/or mesh. In a further detailed embodiment, the flowing step may include wetting the foam, wad, and/or mesh with the ionic liquid. In another further detailed embodiment, the microchannel may include a foam constructed from aluminum, carbon, copper, nickel, stainless steel, alumina, silicon carbide, and/or other structurally sound foam or porous materials. In yet another further detailed embodiment, the microchannel may include a foam coated with a material to increase the wetting over the underlying material. In still another further detailed embodiment, the microchannel may include a plurality of foams having different pore densities.

In another detailed embodiment of the first aspect, the gaseous mixture may include methane and nitrogen. In a further detailed embodiment, the first component gas may include methane and the resultant gas may include nitrogen.

In another detailed embodiment of the first aspect, the gaseous mixture may include carbon dioxide. In a further detailed embodiment, the first component gas may include carbon dioxide.

In another detailed embodiment of the first aspect, the first component gas may include oxygen gas. In yet another detailed embodiment of the first aspect, the first component gas may include a nitrogen compound. In still another detailed embodiment of the first aspect, the method may include the step of using the resultant gas in a subsequent process. In another detailed embodiment of the first aspect, the first component gas may include at least one of nitrogen, hydrogen sulfide, ammonia, $Ni(CO)_4$, and a thiol.

In another detailed embodiment of the first aspect, the ionic liquid may have been diluted to reduce the viscosity by at least 5% from the neat material. In a further detailed embodiment, the ionic liquid may have been diluted with greater than 0.1% water.

In a second aspect, a method for separating component gases from a gaseous mixture according to the present invention may include the steps of providing a gaseous mixture including a first component gas and a second component gas; flowing a first ionic liquid and the gaseous mixture through a first microchannel; absorbing at least a portion of the first component gas into the first ionic liquid while the first ionic liquid and the gaseous mixture flow through the first microchannel, thereby forming a first resultant mixture including a first resultant gas and the first ionic liquid; flowing the first resultant mixture into a first liquid/gas separator; directing the first resultant gas away from the first ionic liquid using the first liquid/gas separator; desorbing at least a portion of the first component gas from the first ionic liquid by changing the temperature of the first ionic liquid; flowing a second ionic liquid and the first resultant gas into a second microchannel; absorbing at least a portion of the second component gas into the second ionic liquid while the second ionic liquid and the separated first resultant gas flow through the second microchannel, thereby forming a second resultant mixture including a second resultant gas and the second ionic liquid; flowing the second resultant mixture into a second liquid/gas separator; directing the second resultant gas away from the second ionic liquid using the second liquid/gas separator; and desorbing at least a portion of the second component gas from the second ionic liquid by changing the temperature of the second ionic liquid. In an alternate embodiment, two or more ionic liquids can be used in sequential processing steps of the cycle.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein.

In a third aspect, a microchannel device according to the present invention may include a first plurality of microchannels; and a second plurality of microchannels, each of the second plurality of microchannels being separated from at least one of the first plurality of microchannels by one of a plurality of walls. At least one of the walls may include a plurality of voids, the voids being arranged to permit heat transfer from one of the first plurality of microchannels to one of the second plurality of microchannels while reducing heat conduction along a length of the wall.

In a fourth aspect, a method for conducting a chemical process according to the present invention may include the steps of flowing a fluid through a first microchannel; flowing the fluid through a second microchannel, the second microchannel being in thermal communication with the first microchannel so that heat is transferred from the fluid to the first microchannel, from the first microchannel to the second microchannel, and from the second microchannel to the fluid.

In a detailed embodiment of the fourth aspect, the first microchannel and the second microchannel may be constructed in common block. In another detailed embodiment of the fourth aspect, the step of flowing a fluid through a first microchannel may include an absorption process and the step of flowing the fluid through a second microchannel may include a desorption process. In another detailed embodiment of the fourth aspect, the first microchannel and the second microchannel may be arranged in a counterflow arrangement.

In a fifth aspect, a processing system according to the present invention may include a first microchannel including a first absorbent inlet, a first absorbent outlet, a feed stream inlet, and a first resultant gas outlet; a second microchannel including a second absorbent inlet, a second absorbent outlet, and a second resultant gas outlet, the second microchannel being arranged in a counterflow arrangement relative to the first microchannel; and an absorbent circulating through the first microchannel and the second microchannel. The absorbent may have a temperature $T1$ at the first inlet, a temperature $T2$ at the first outlet, a temperature $T3$ at the second inlet, and a temperature $T4$ at the second outlet. At least one of the following conditions may be satisfied: $T2$ is greater than $T3$ and $T1$ is greater than $T4$. The feed stream inlet may receive a flue gas feed including nitrogen and carbon dioxide, the first resultant gas outlet may exhaust a first resultant gas having a higher concentration of nitrogen than the flue gas feed, and the second resultant gas outlet may exhaust a second resultant gas having a higher concentration of carbon dioxide than the flue gas feed.

In a sixth aspect, a processing system according to the present invention may include a first microchannel including a first absorbent inlet, a first absorbent outlet, a feed stream inlet, and a first resultant gas outlet; a second microchannel including a second absorbent inlet, a second absorbent outlet, and a second resultant gas outlet, the second microchannel being arranged in a counterflow arrangement relative to the first microchannel; and an absorbent circulating through the first microchannel and the second microchannel. The absorbent has a temperature T1 at the first inlet, a temperature T2 and the first outlet, a temperature T3 at the second inlet, and a temperature T4 at the second outlet. At least one of the following conditions is satisfied: T2 is greater than T3 and T1 is greater than T4. The feed stream inlet may receive a mixture including at least one hydrocarbon and nitrogen, the first resultant gas outlet may exhaust a first resultant gas having a higher concentration of nitrogen than the mixture, and the second resultant gas outlet may exhaust a second resultant gas having a higher concentration of the at least one hydrocarbon than the mixture.

In a seventh aspect, a processing system according to the present invention may include a first microchannel including a first absorbent inlet, a first absorbent outlet, a feed stream inlet, and a first resultant gas outlet; a second microchannel including a second absorbent inlet, a second absorbent outlet, and a second resultant gas outlet, the second microchannel being arranged in a counterflow arrangement relative to the first microchannel; and an absorbent circulating through the first microchannel and the second microchannel. The absorbent has a temperature T1 at the first inlet, a temperature T2 at the first outlet, a temperature T3 at the second inlet, and a temperature T4 at the second outlet. At least one of the following conditions may be satisfied: T2 is greater than T3 and T1 is greater than T4. The feed stream inlet may receive a mixture including at least one hydrocarbon and at least one contaminant, the first resultant gas outlet may exhaust a first resultant gas having a higher concentration of the hydrocarbon than the mixture, and the second resultant gas outlet may exhaust a second resultant gas having a higher concentration of the contaminant than the mixture.

In detailed embodiment of the seventh aspect, the mixture may be a natural gas feed and the contaminant may be at least one of H2S, a thiol, and another sulfur-containing compound.

In another detailed embodiment of the seventh aspect, the system may include a first Fischer-Tropsch reactor, where the feed stream inlet is coupled to an outlet of the Fischer-Tropsch reactor. In a further detailed embodiment, the system may include a second Fischer-Tropsch reactor and at least one of the first resultant gas outlet and the second resultant gas outlet is coupled to an inlet of the second Fischer-Tropsch reactor.

In an eighth aspect, a processing system according to the present invention may include a first microchannel including a first absorbent inlet, a first absorbent outlet, a feed stream inlet, and a first resultant gas outlet; a second microchannel including a second absorbent inlet, a second absorbent outlet, and a second resultant gas outlet, the second microchannel being arranged in a counterflow arrangement relative to the first microchannel; and an absorbent circulating through the first microchannel and the second microchannel. The absorbent may have a temperature T1 at the first inlet, a temperature T2 at the first outlet, a temperature T3 at the second inlet, and a temperature T4 at the second outlet. At least one of the following conditions may be satisfied: T3 is greater than T2, T4 is greater than T1, and T2 is greater than T4. The feed stream inlet may receive a mixture including nitrogen and oxygen, the first resultant gas outlet may exhaust a first resultant gas having a higher concentration of nitrogen than the mixture, and the second resultant gas outlet may exhaust a second resultant gas having a higher concentration of oxygen than the mixture.

In a ninth aspect, a processing system according to the present invention may include a first microchannel including a first absorbent inlet, a first absorbent outlet, a feed stream inlet, and a first resultant gas outlet; a second microchannel including a second absorbent inlet, a second absorbent outlet, and a second resultant gas outlet, the second microchannel being arranged in a counterflow arrangement relative to the first microchannel; and an absorbent circulating through the first microchannel and the second microchannel. The absorbent may have a temperature T1 at the first inlet, a temperature T2 at the first outlet, a temperature T3 at the second inlet, and a temperature T4 at the second outlet. At least one of the following conditions may be satisfied: T3 is greater than T2, T4 is greater than T1, and T2 is greater than T4. The feed stream inlet may receive a mixture including at least one hydrocarbon and at least one contaminant, the first resultant gas outlet may exhaust a first resultant gas having a higher concentration of the hydrocarbon than the mixture, and the second resultant gas outlet may exhaust a second resultant gas having a higher concentration of the contaminant than the mixture.

In a detailed embodiment of the ninth aspect, the mixture may be a natural gas feed and the contaminant may be at least one of H2S, a thiol, and another sulfur-containing compound.

In another detailed embodiment of the ninth aspect, the system may include a first Fischer-Tropsch reactor, where the feed stream inlet is coupled to an outlet of the Fischer-Tropsch reactor. In a further detailed embodiment, the system may include a second Fischer-Tropsch reactor and at least one of the first resultant gas outlet and the second resultant gas outlet may be coupled to an inlet of the second Fischer-Tropsch reactor.

In a tenth aspect, a processing device according to the present invention may include a pump having a suction and a discharge; and a plurality of microchannels, each of the plurality of microchannels having an inlet and an outlet. Each of the inlets may be directly fluidically connected to the discharge and each of the outlets may be directly fluidically connected to the suction. In a further detailed embodiment, inlets may be arranged radially around the discharge. In a still further detailed embodiment, the inlets may be symmetrically arranged.

In another further detailed embodiment, the outlets may be arranged radially around the suction. In a still further detailed embodiment, the outlets may be symmetrically arranged.

In an eleventh aspect, a method of processing a material may include forming a plurality of miscelles in an ionic liquid in a microreactor; crystallizing the miscelles to form crystals; and separating the crystals from the ionic liquid. In a detailed embodiment, the step of forming a plurality of miscelles in an ionic liquid may include controlling at least one of temperature, residence time, and addition of reactants.

In a twelfth aspect, a method of processing a material according to the present invention may include forming a plurality of miscelles in an ionic liquid in a microreactor; crystallizing the miscelles to form crystals; and separating the crystals from the ionic liquid.

In a detailed embodiment of the twelfth aspect, the step of forming a plurality of miscelles in an ionic liquid may include controlling at least one of temperature, residence time, and addition of reactants.

In an thirteenth aspect, a method of processing a material may include flowing two fluids into a microreactor, the two fluids including a continuous phase and a discontinuous phase, at least one of the continuous phase and discontinuous phase including an ionic liquid; and combining the continuous phase and the discontinuous phase in the microreactor to form at least one of an emulsion and a dispersion.

In a detailed embodiment of the thirteenth aspect, the step of combining the continuous phase and the discontinuous phase may include controlling at least one of temperature, residence time, and addition of reactants.

In a fourteenth aspect, an emulsion may include a continuous phase and a discontinuous phase, where at least one of the continuous phase and the discontinuous phase is an ionic liquid.

In a detailed embodiment of the fourteenth aspect, the continuous phase may be an ionic liquid. In a further detailed embodiment, the discontinuous phase may include a plurality of micelles.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein.

BRIEF DESCRIPTION OF THE SEVERAL VIEWS OF THE DRAWING

The detailed description particularly refers to the accompanying Figures in which.

DETAILED DESCRIPTION OF THE INVENTION

Figure 1:
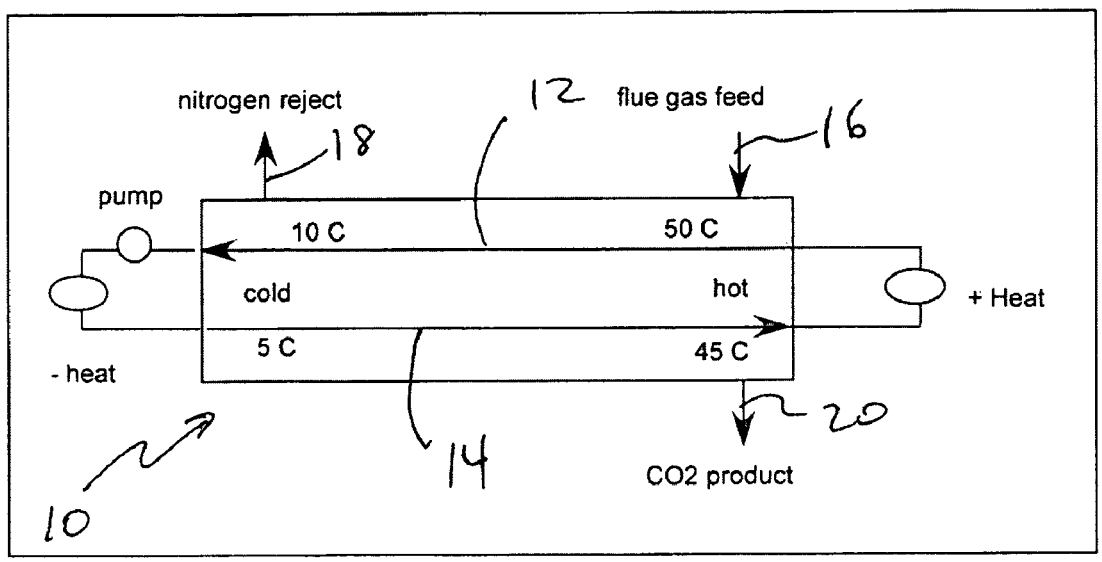
FIG. 1 is a diagram showing an exemplary process for extracting CO2 from a flue gas feed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Exemplary embodiments include a thermally efficient system that includes at least an absorption, desorption, and recuperative heat exchange unit operation. At least two of these may integrated into a single microchannel apparatus. In some embodiments, all three are integrated into a single microchannel apparatus.

As shown in FIG. 1, in exemplary three unit operations of absorption, desorption, and recuperation integrated in a single microchannel apparatus 10, four critical temperatures are defined where T1 is the inlet temperature of the absorbent at the start of the absorption channel 12, T2 is the outlet temperature of the absorbent at the end of the absorption section of the channel 12, T3 is the inlet temperature at the start of the desorption channel 14 and T4 is the outlet temperature of the desorption channel 14, wherein T2 is greater than T3 and/or T1 is greater than T4. For an exemplary system, heat flows from the absorption unit operation to the desorption unit operation.

The applied temperature gradients while counterintuitive aid in the recuperation of energy between absorption and desorption. Close approach temperatures are desired between either the T1 and T4 streams at one end of the apparatus, the T2 and T3 streams at one end of the apparatus, or both the T1 and T4 streams and the T2 and T3 streams. The approach temperature between the T1 and T4 end of the apparatus may be less than 10 C, or less than 5 C, or less than 2 C, or less than 1 C, or in exemplary embodiments between 0.05 and 1 C. The approach temperature between the T2 and T3 end of the apparatus may be less than 10 C, or less than 5 C, or less than 2 C, or in exemplary embodiments between 0.05 and 1 C. A small amount of energy must be augmented or added to the absorption fluid as it flows from the desorption 14 to the absorption 12 channel. A small amount of energy must be removed from the absorbent as it flows from the absorption to the desorption channel. Further T4 must be greater than T2 for absorbents whose Henry's law constants increase with temperature.

In an alternate embodiment where the Henry's law constant decreases with temperature, as that reported for oxygen in BmimPF6 ionic liquid, then the reverse temperature profile is desirable where T2 is greater than T4 and T3 is greater than T2 and or T4 is greater than T1.

In other embodiments, the parasitic power loss for the absorption system is less than 20% of the system produced power, and less than 10% in some embodiments.

In an alternate embodiment, the process is used to capture dilute amounts of a solute 20, roughly less than 30% of the inlet feed stream 16. In this case, the thermal integration scheme may vary and may not need to be as highly integrated. In one embodiment, the absorption occurs in a near isothermal zone, as defined by a gradient less than 50 C, or less than 20, or less than 10 C. The unsorbed species 18 travel through the microchannel absorption unit operation to a second unit operation for downstream processing, while the dilute species is captured for either use elsewhere within a process system, or disposal as a waste product. As an example, this technology could be used to capture H2S, NH3, Ni—CO, or any other dilute species to clean a fluid stream for subsequent downstream processing in a reactor, separator, mixer, heat exchanger, or other chemical unit operation. The advantage for the capture of the dilute species in a microchannel apparatus is the reduced footprint and cost which creates attractive flowsheets for both small capacity process systems or large scale systems. As an example, this separation scheme could be useful for a small scale gas-to-liquids facility to clean up or remove dilute unwanted species from the synthesis gas generated from a gasifier, autothermal reformer, partial oxidation reactor, steam reformer or any other reactor. Further, the clean up technology could be applied to remove H2S, thiols, other sulfur bearing species, or other contaminants from natural gas as found in pipelines, natural gas wells, or other sources of hydrocarbon feedstocks. The exemplary process has applications as a gas clean up step for other technologies, including removing contaminants from any hydrocarbon-laden stream, air, high purity gases for electronics, welding, or any other application, where the purity must exceed 90% of a desired component, and more than 95% purity. Applications may also include methanol synthesis, synthesis of organic liquids or gases, or the purification of inorganic fluids.

Exemplary embodiments may include thin film separations. For example, mesh flow with counterflow of feeds such that the flow of the liquid absorbent is retained or constrained within a channel or structure by the use of capillary forces that minimize the mixing or back mixing of a liquid and a gas in a microchannel.

Exemplary embodiments may include mixed phase flow using surface features, for example a one pass process with co-flow feeds. The fluid mixture of liquid and gas are co-fed either inside or outside of the microchannel device and flow in a co-flow arrangement. The fluid is pushed and pulled in and out of the surface features.

Exemplary embodiments may include multiphase flow through packed bed with co-flow of feeds. The gas and liquid flow in a co-flow arrangement and are mixed to create a high interfacial area by flowing past a series of obstructions in the form of posts, baffles, and/or a porous packed bed of rings, spheres, or other shapes.

Exemplary embodiments may include contactor based absorption and desorption unit operations where a thin contactor plate separates the phases to assist with countercurrent flow. The contactor plate has sufficiently small apertures such that capillary pressure of the liquid retains the liquid on one side of the contactor plate and the gaseous stream on the other side of the contactor plate.

Exemplary embodiments may include foam flow, where the gas and liquid stream flow substantially through a foam, wad, mesh or other porous and connected media. The connected media may be assembled with the close coupling of several porous media, such as a stack of foams rather than assembled from a discontinuous array of particles such as pellets or beads. The flow of gas and liquid sorbent through the foam may be countercurrent or co-current. The liquid preferentially wets the foam or continuous and connected media to increase the surface area and absorbs one or more species during the absorption cycle and desorbs one or more species during the desorption cycle.

Exemplary systems including multiple unit operations may be configured to reduce the amount of additional energy or power required to drive the separation process. For example, an exemplary microchannel absorber uses an ionic liquid to absorb a solute gas from a feed gas comprising same. The feed gas flows into the absorber at a first temperature and pressure. The solute is preferentially absorbed into the ionic liquid or other absorbent, while the less strongly absorbed solute, which has much less affinity to absorption by the ionic liquid or other absorbent, passes through and exits the absorber as a lean gaseous stream.

The solute may be desorbed in a second unit operation. Increasing the temperature reduces the affinity for the absorbed solute and therefore desorbs the solute. For example, the Henry's constant for oxygen is 23000 bar at 10 C and drops to 1550 bar at 50 C. The temperature of an absorbed mixture of oxygen and BmimPF6 would be decreased to desorb the oxygen. Alternative ionic liquids or other absorbents may have a different response of a cold absorption and hot desorption. In another exemplary embodiment, the temperature may be either increased or decreased to assist with the desorption of the solute and/or the pressure may be decreased to also assist with the desorption of the solute.

Other exemplary embodiments include single unit operation with a cold and a hot end to recuperate energy between absorption and desorption to improve the energy recovery and system efficiency. Also, two unit operations (one cold and one hot), where energy is recuperated between the unit operations to reduce the parasitic power requirement. In another exemplary embodiment, a distillation type configuration includes an interior feed point and a concentrated methane stream removed at the top of the channel and a concentrated nitrogen stream removed at the bottom of the column. Heat may be required to add or remove at the top and or bottom or interior points of the channel.

A solute may have little or no affinity in the liquid absorbent and may be removed at the end of the absorption channel, while the sorbed species are absorbed into the liquid. The liquid may be pumped to a desorption stage, where the sorbed gases or liquids are removed. A single stage absorption may be required.

If the undesired absorbate is partially absorbed in a selected ionic liquid, then multiple stages may be required and a counter flow of the liquid and gas may be advantageous.

Exemplary embodiments may perform CO2 removal from a stream to either purify a product stream or to capture carbon dioxide for reuse or sequestration with a small amount of parasitic power loss. It has been suggested that a conventional amine separation system requires on the order of 40% of the power plant energy to capture carbon dioxide from a power plant flue gas. An exemplary system requires less than 20% parasitic power loss. In alternate embodiments, less than 10% and in some cases less than 5% parasitic power loss could be enabled with the described microchannel absorption system.

Other exemplary embodiments may perform O2 removal from a stream. For some systems, the removal of oxygen represents a system advantage to either remove a reaction species for purification of a product or to capture oxygen for use in other applications. Exemplary systems may incorporate a high degree of thermal integration as to reduce the parasitic power loss or reduce the specific power (kW-hr/ton O2) required to purify the oxygen.

In another exemplary embodiment, sulfur may be removed from a plant feed. Sulfur often represents an unwanted species that may foul a catalyst or contaminate a product stream or the exhaust stream vented to the environment. Capture of the sulfur species with a minimal requirement of additional energy may represent a system advantage.

In other exemplary embodiments, other gases, dilute or concentrated, may be removed from a solute-containing stream, where the purified stream is used for a downstream unit operation. For example, the purified stream may be used for a reaction, mixing, second separation process, heat exchange, and the like. Other exemplary embodiments may remove other gases, dilute or concentrated, from a solute-containing stream, where the purified stream is a final product that is packaged for market delivery.

Exemplary microchannel separation systems may provide unique advantages for biofuels to concentrate the reactants from a gasifier before entering a production reactor that may include a Fischer Tropsch or DME or methanol synthesis reactor, to remove or reduce the myriad of contaminants that may comprise a feed source, especially from municipal or other waste sources, and finally to concentrate the oxygen to enable a more efficient gasifier that does not operate directly on air but rather a more efficient source of pure or concentrated oxygen. For example, air separation for the gasifier feed may include high conversion of O2 (99+%) and enriched air (90+%) to reduce the amount of diluent (nitrogen) in the gasifier and thus the gasifier size and cost.

Exemplary embodiments may be used for gas cleanup, in which the absorption process may be used to remove H2S, NH3, CO2, N2, heavy tars, and other impurities, for example.

Exemplary embodiments may also be utilized to remove CO2 from the gaseous product of a Fischer Tropsch (FT) reactor. For a highly carbon and thermal efficient Fischer Tropsch system, the effluent from the outlet of a first stage FT reactor is supplied to a second stage FT reactor. Removal of the carbon dioxide and or methane from the first FT product stream concentrates the reactant stream for the inlet of the second FT reactor. A more concentrated reactant stream reduces the size and cost of the second stage of the FT reactor system.

For oxygen applications, high purity is desired for a number of applications, including merchant applications, chemical processing, medical, and welding among others. For these applications greater than 99% oxygen is sought and it is desired to have an efficient source of the oxygen and thus reduce the energy requirement to concentrate oxygen.

Enriched air, including enriched air at >90% purity, also represents applications for some chemical processing including oxidation reactions, medical, and combustion processes. Enriched air can improve the performance of furnaces used in many industries, including chemical, petroleum, and metal processing (e.g. steel processing). Applications include the combustion of a fuel comprising hydrogen, methane, and/or carbon monoxide to drive the endothermic methane steam reforming reaction. Enhanced air at 50% or greater oxygen also represents an opportunity for a thermally advantaged system especially for the fuel combustion that drives the endothermic methane steam reforming reaction. For these applications, the application system will not be advantaged if the energy requirement to purify the oxygen is high. For the described thermally advantaged oxygen capture systems, the specific power requirement to produce oxygen will be less than 1000 kW-hr/ton, more preferably less than 500 kW-hr/ton, and more preferable still less than 250 kW-hr/ton. In one embodiment it may be less than 200 kW-hr/ton and in another between 50 and 250 kW-hr/ton.

Other exemplary applications for the Gas to Liquids processes includes the removal of nitrogen from the FT tail gas to reduce the diluent and in turn reduce the size and cost of the reactors. In addition the an exemplary system may be used to capture water from the combustion exhaust stream to reduce the requirement for fresh water in a gas to liquids or other application. Reduction of fresh water is of particular advantage for off-shore or remote processing environments. It may also be advantageous in a non-attainment area to reduce the need for fresh water or the rejection of process water into a local ecosystem.

For natural gas processing plants, the removal of acid gases including CO2 and H2S in a thermally efficient manner may represent an advantage for the upgrading of natural gas including sour sources in an economic and efficient process.

Another application for an exemplary system is the purification of oxygen from air or production of air enriched with oxygen to drive an autothermal reformer to be used for hydrogen or syngas production, which may be used in a fuel processing, fuel cell, or a gas to liquids system. In an alternate embodiment, the purified air may be used in a partial oxidation system for converting a hydrocarbon, including methane, to synthesis gas or any hydrocarbon to a useful oxygenated hydrocarbon or an olefinic product.

Landfill gas is may also benefit from the removal of nitrogen and or acid gas and or other trace contaminants that will deleteriously impact the downstream processing catalysts required to upgrade the gas to either the purity of a natural gas pipeline or for the conversion to a liquid fuel.

Additional exemplary applications of enriched air include enhancement of bioreactors, including fermentation.

Gas Separations

The prior art discusses the use of ionic liquids for acid gas removal from light gases; separation of olefins from paraffins, dienes from olefins, and aromatics from olefins; removal of mercaptans from hydrocarbon streams. The prior art also teaches use of ionic liquids as an additive to improve distillation of close boiling compounds. However, the prior art does not teach selective absorption/desorption of compounds within a homologous series of hydrocarbons, e.g. C2 from C3, etc.

Differences in relative absorption capacities with respect to temperature or pressure may be used to enhance separation of natural gas liquids (NGL). The current practice for separating natural gas liquids in a gas processing plant involves distillation for purification of each of the desired products, e.g. ethane, propane, butane, pentane. Distillation operations have a large footprint, and consume energy which otherwise could have been recovered as a hydrocarbon product. A train of microchannel-based multiple absorption/desorption zones within one device or multiple devices may be used to provide multiple equilibrium stages for separation of NGL products based on relative absorption capacities. Microchannel-based heat exchangers can provide integrated recuperative heat exchange to recover energy used for desorption.

Pump Implant

A limitation with minimizing energy consumption for microchannel-based processes requiring pumping relates to the practical limitations of pumping efficiency of multiple streams at low flow rates vs. the pump efficiency of one stream at a high flow rate. Input of mechanical work, including pumping, is typically most efficient at higher flow rates to preserve an acceptable efficiency for work input. The result is that input of mechanical energy to a working fluid is usually supplied to a stream outside of a microchannel device; this approach requires manifolding between the macro and micro scales, resulting in excess dead volume for the fluid and, as well as loss in exergetic efficiency.

One way to counter this limitation is to design the microchannel apparatus to be built around the casing of a pump, wherein individual connecting channels or submanifolds are directed symmetrically into the suction side of a pump casing, and then discharged symmetrically on the discharge side of the pump casing. Alternatively, the pump casing may be built into the microchannel device to accomplish the same aforementioned goal.

An exemplary embodiment includes directing microchannels or submanifold channels in a radial or spherical direction in the suction (inlet) and/or discharge (outlet) entrances of the pump. The microchannels connecting to the pump cavity may need to be at a different angle or orientation than the microchannels used to conduct additional unit operations, such as mixing, heat exchange, chemical reaction, and chemical separation. The pump may be of the centrifugal type, using acceleration of fluid around a moving shaft. The pump may include a seal through which the moving shaft is connected to an exterior motor.

Emulsification and Crystallization Using Ionic Liquids in Microchannels

Many compositions and properties are possible for ionic liquid solvents, which can be tailored using suitable design and chemical synthesis techniques. Micelles of materials can be formed within an ionic liquid solvent, and the size and morphology of the micelles can change with process conditions (e.g. temperature).

Microreactors can be used to precisely control temperature, residence time, and addition of components/reactants in order to form tailored micelles in an ionic liquid medium. Formation of the micelles may be used as a step in a crystallization process, wherein the solids are formed with controlled size and morphology. Once formed, the solids may be removed with a subsequent separation step. The ionic liquid is used in this case as a green solvent which assists the formation of the micelle.

Ionic Liquid in Thermal Compressor

The properties of ionic liquid can be tailored to provide thermal and transport properties as desired. This ability enables ionic liquids as a good candidate for absorbents in thermal compressors and in applications requiring thermal compressor such as vapor absorption refrigerators.

Figure 2:
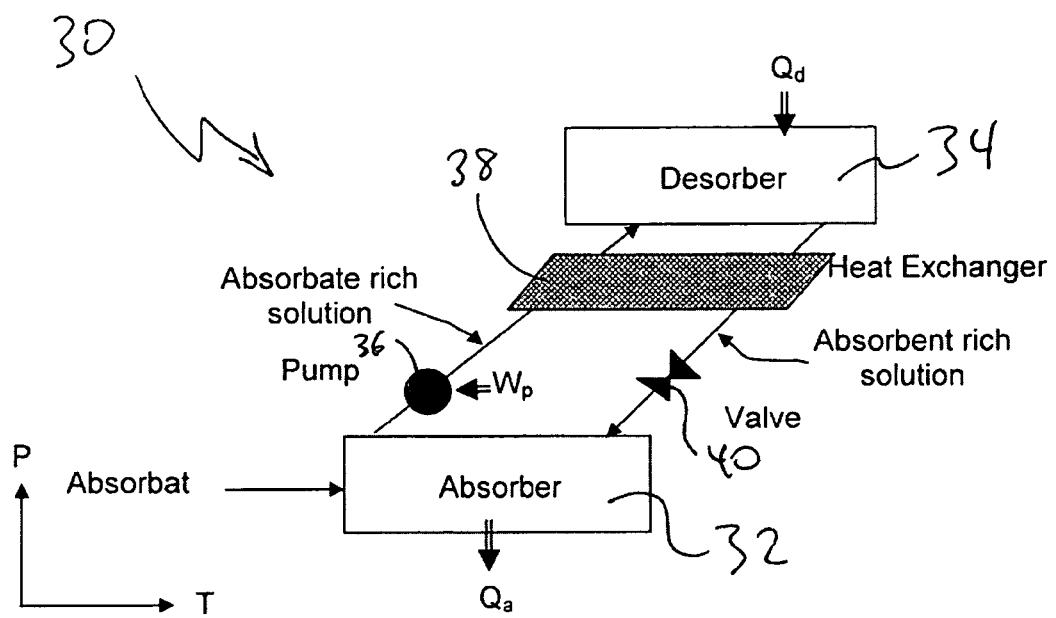
FIG. 2 is a schematic diagram of an exemplary thermal compressor utilizing an ionic liquid.

A schematic of an exemplary thermal compressor 30 is shown in FIG. 2. A thermal compressor is an example of utilizing waste heat (available at T>100° C.) from another process to convert a low temperature/pressure fluid to high temperature/pressure fluid. The absorbate at low temperature and pressure is absorbed in the absorbent in the absorber 32. This process will require heat removal ($Q_a$) as the mixing process gives out heat of mixing. For some ionic liquids, the heat of absorption has been reported as endothermic and thus the temperature of the working solution or absorbent will decrease during absorption. The absorbate rich solution is then pumped to Desorber 34 which operates at higher pressure and temperature by utilizing waste heat ($Q_d$) from other processes. In desorber 34, the high temperature removes the absorbate from the mixture and the absorbate is now available at high pressure and temperature. The work input at pump 36 is small ($W_p$) while The absorbent rich solution is sent back to the absorber 32 through solution heat exchanger 38 and valve 40 (or a pressure reducing medium). The solution heat exchanger 38 exchanges heat between absorbate rich solution and absorbent rich solution to reduce heat duties of absorber 32 and desorber 34. The work input from the pump 36 ($W_p$) is generally small while heat input ($Q_d$) is available as waste heat source, so the thermal compressor 30 can operate at a low operating cost. The exemplary system is thermally integrated using microchannel heat exchangers 38 and/or absorption and desorption channels to reduce the system parasitic power loss.

Figure 3:
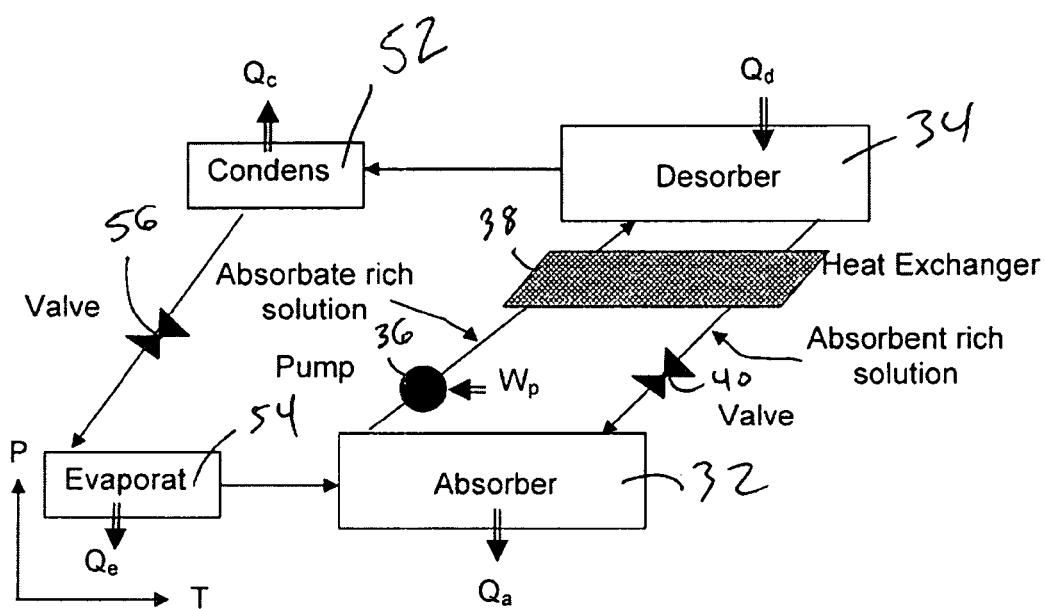
FIG. 3 is a schematic diagram of an exemplary thermal compressor utilizing an ionic liquid and an absorption refrigeration cycle.

The high temperature and pressure absorbate can be used for absorption refrigeration cycle as shown in FIG. 3. In vapor absorption cycle, the absorbate is sent to condenser 52 where it condensers fully or partially and then send to evaporator 54 via a pressure reducing valve 56. The absorbate is either partially or fully condensed when it goes through the pressure reducing valve 56. The absorbate is heated up in evaporator 54 using the heat from the source that requires cooling. The generated vapor goes to the absorber thus completing the cycle.

The ability to manipulate ionic liquids properties provides several advantages for use in thermal compressor and its applications. Generally the ionic liquids have strong affinity for gases such as hydrocarbons allowing less absorbent required for the system. The ionic liquids are generally stable over a range of temperature which is also an important requirement for the absorbent in a thermal compressor. The high volatility ratio results in easier separation of absorbate and absorbent in the desorber 34 improving the overall efficiency of the cycle. In some embodiments, ionic liquids can also be used in a double effect absorption cycle.

In one exemplary embodiment components of thermal compressor and vapor absorption cycle (evaporator 54, absorber 32, desorber 34, condenser 52) are conventional devices. In another exemplary embodiment, components of thermal compressor and vapor absorption cycle (evaporator, absorber, desorber, condenser) are microchannel devices.

Microchannel Heat Exchanger to Recuperate Ionic Liquid Sorbent

Figure 4:
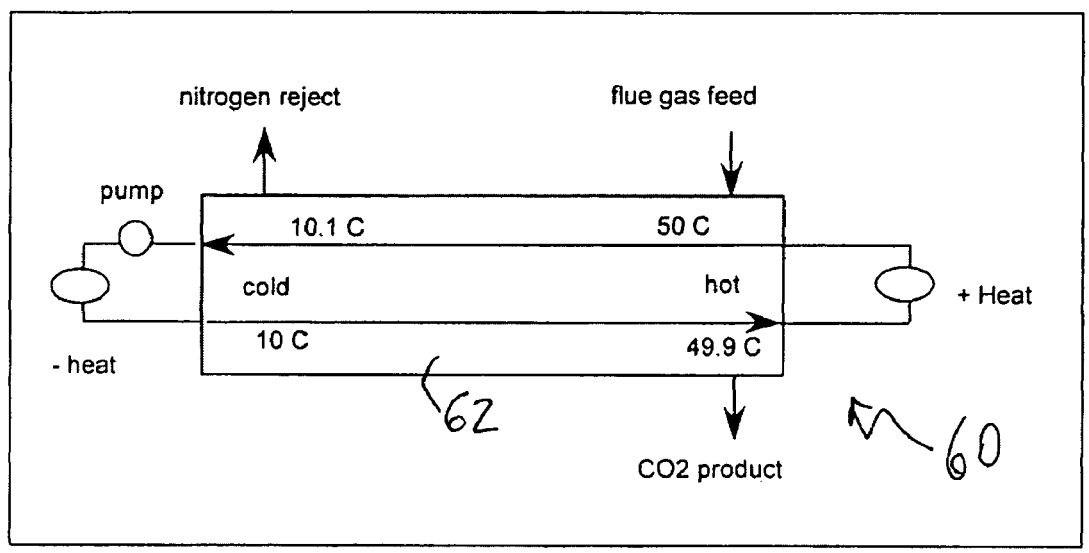
FIG. 4 is a diagram of an exemplary absorption/desorption process of carbon dioxide into an ionic liquid for separation.

It may be advantageous to reduce the parasitic energy loss in the absorption/desorption process of, for example, methane into ionic liquid for separation in order to make the system operation economical. This means to reduce the energy input "−heat" or "+heat" in the exemplary system 60 shown in FIG. 4, which is equivalent to having a heat recuperation with very tight temperature approach at the hot and cold end.

An exemplary microchannel heat exchanger/recuperator is disclosed here in a design example of the following performance conditions:

Liquid flow rate: 54,000 L/min; closed loop system

CP=1407 J/mol-K
density=1.37 gm/cc
viscosity=30 cP
$T_{max}$=50 C
$T_{low}$=10 C
Thermal conductivity=0.19 W/m-K
Approach temperature target 0.1 to 0.25 K on each end.
Liquid volume 1000-10000 liter.
Material: stainless steel.

Figure 5:
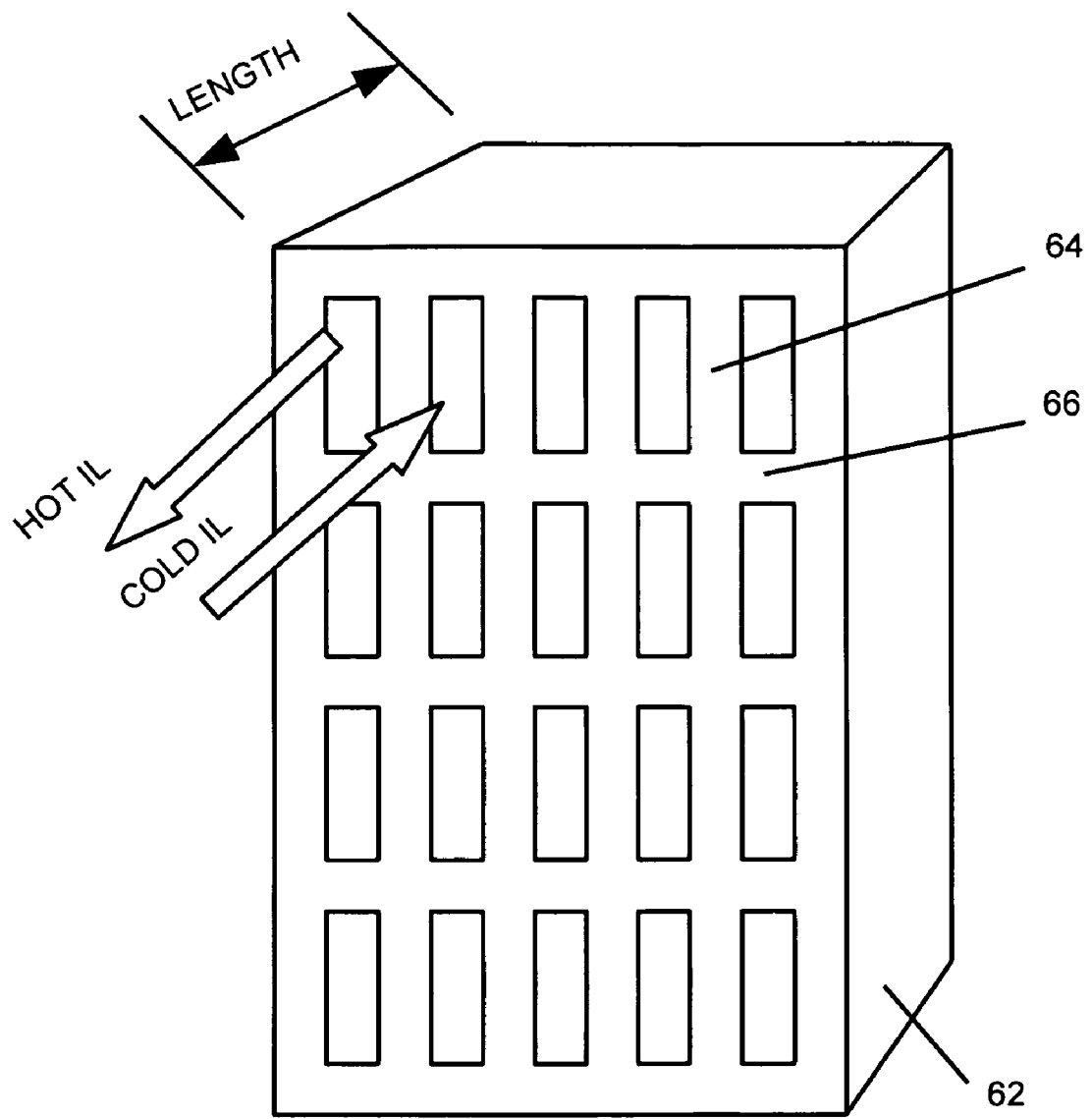
FIG. 5 is a cross-sectional view of an exemplary microchannel heat exchanger core.

In an exemplary embodiment shown in FIG. 5, a countercurrent flow arrangement is used in the device 62. The microchannel wall 64 is 0.01" thick that separates the hot and cold liquids, while the channel gap size 66 is also 0.01". For the above given flow rate at each side, a total length of 48" is necessary to achieve a 0.25 K approach temperature at the two ends for a goal of a temperature differential near 40 C between the hot and cold ends of the absorption and desorption system. For a system requiring a smaller temperature difference to achieve a desired system capacity for the absorbed solute, perhaps 20 C or 10 C or more or less difference between maximum and minimum temperature, then the advantaged process may have a shorter heat exchanger length less than 48" to achieve a very small (<1 C) approach temperature.

Figure 6:
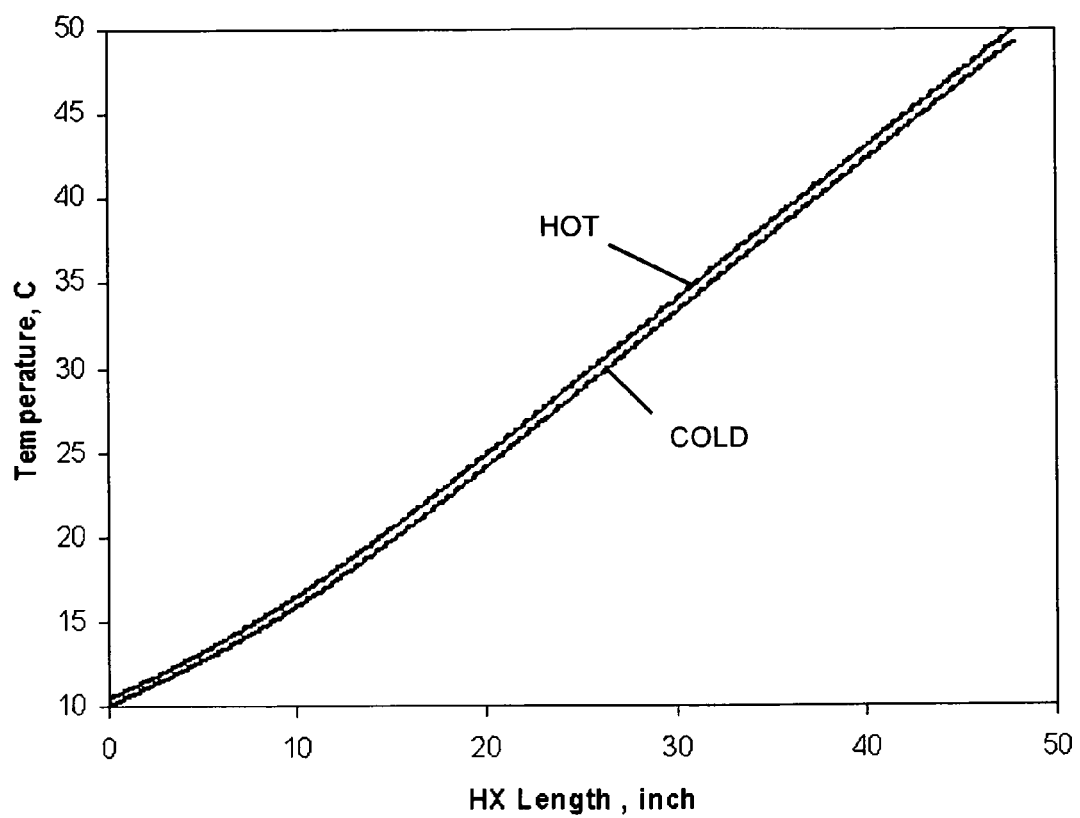
FIG. 6 is a plot of temperature versus heat exchanger length showing a calculated temperature profile of an exemplary microchannel heat exchanger.

FIG. 6 shows a calculated temperature profile of the exemplary microchannel heat exchanger.

Table 1 provides exemplary parameters of the ionic liquid heat exchanger with 0.25 K approach temperature.

TABLE 1

| # of channel | 5000000 | |
|---|---|---|
| Density | 1370 | kg/m3 |
| Total Flow Rate | 50000 | L/min |
| | 4110000 | kg/h |
| Flow rate/channel | 0.01 | L/min |
| | 822 | g/h |
| Dh | 0.038095238 | in |
| | 0.000967619 | |
| A | 1.29032E−06 | m3 |
| Re | 5.707619881 | |
| Channel volume | 7.86579E−07 | m3 |
| Total liquid volume | 3.933 | m3 |
| Metal volume/channel (No perimeter) | 9.439E−07 | m3 |
| | 4.72 | m3 |
| Heat transferred/channel | 12.57665 | Watts |
| Total | 62883250 | Watts |

The building material of the exemplary heat exchanger can be any chemically compatible metal or non-metal. As long as its thermal conductivity is in the range 0.1-1000 W/m K, the change in the approach temperature is less than 1 degree Celsius. However, the liquid conductivity has a great effect. For a diluted ionic liquid, for example [bmim][PF6], at a conductivity 0.38 W/m K, the heat exchanger length can be shortened to less than 30" for the same approach temperature. Thus, for an optimization combining thermal and chemical processes, a diluted ionic liquid with higher thermal conductivity components is an option.

The Liquid Jet Enhanced Gas-Liquid Contact For Gas Absorption

For an efficient gas component separation via absorption in liquid sorbent, such as separation of CH4 from field gas using ionic liquid, good contact or mixing between the gas mixture (feed) and the liquid phase may be desired. However, because some liquid sorbents are highly viscous, such as the ionic liquid [bmim][PF6] with a dynamic viscosity of 382 cP at room temperature, to break up liquid phase to have a larger gas-liquid interfacial area is not straightforward in the absorption process. Thus, the mass transfer between gas and liquid is often limited by lack of good gas-liquid contact or mixing.

Surface tension that acts at the liquid surface tends to regularize the surface based on the facts that a gas-liquid interface possesses a specific energy and that liquid is deformable. A drop or a pocket of liquid takes the shape minimizing its surface area. On the other hand, there are some situations where a localized stress can deform a liquid surface in an extraordinary manner, which may be used in exemplary embodiments to enhance gas-liquid contact.

Figure 7:
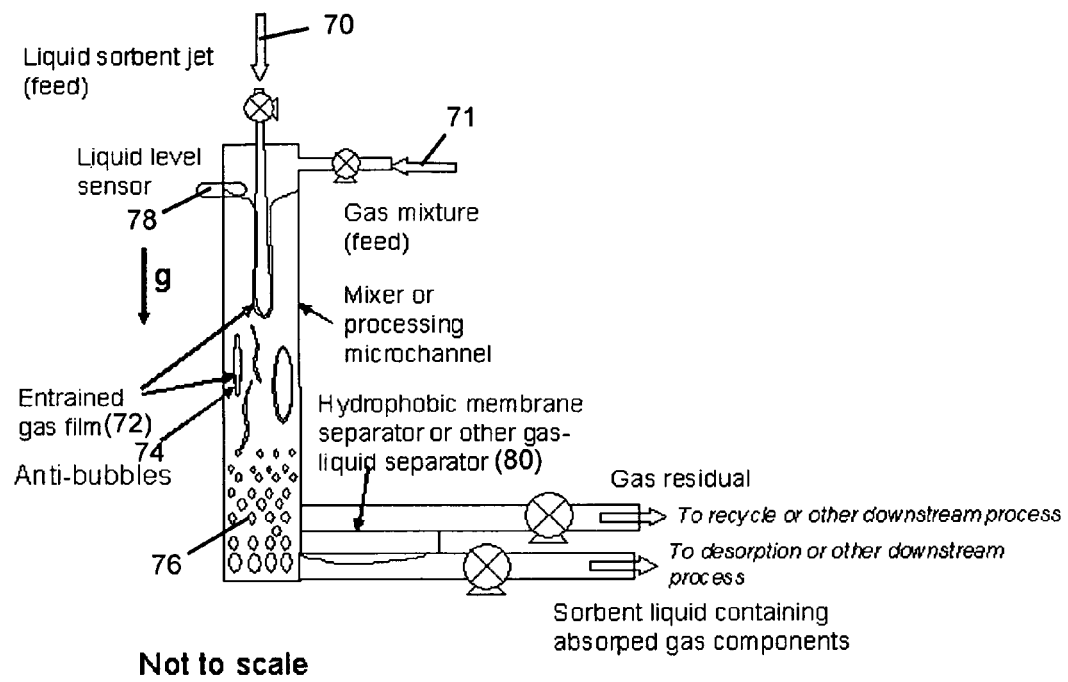
FIG. 7 is a cross-sectional view of an exemplary jet-enhanced contactor.

For example, and as shown in FIG. 7, when a highly viscous liquid 70 (10~1000000 cP) is jetted into the same or other also viscous liquid 71 at the gas-liquid interface at a high speed (1 mm/s to 100 m/s, for example), the gas is entrained between the two liquid parts (the jet and the bath) to form very thin gas film 72 in between. The thickness of the gas film 72 can be several microns. Some jetted liquid sheds away from the jet stream to form so-called "anti-bubble" 74 which is a liquid droplet completely separated from the bulk liquid by thin gas film 72. However, these "anti-bubbles" are not stable generally. After their breakups, very small gas bubbles 76 are formed downstream of the process channel or the jet zone. In such away, the gas and the liquid get excellent contact via a temporally drastically increased interfacial area. Hence, mass transfer of the absorbate components and, in turn, the absorption process is enhanced. The existence of a gas-liquid surface at the jetting site may be important to entrain the gas; thus, the control of the liquid level in the mixer or the feed point may be needed. This can be realized by using a sensor 78, such as electric capacitance or impendence, laser or gamma ray detector, and a signal feedback controller of the pumps' flow rates of outflow liquid and gas residual. In the control logic, the jet flow rate and gas inlet flow rate may also be inputs to determine the liquid level inside the process channel/chamber space. To the downstream processes, the liquid and gas phases may need to be separated in a compact configuration, especially when the mixer or the process channel is in microchannel fashion. An in-line membrane gas-liquid separator 80 is also disclosed here. The membrane may be of a hydrophobic nature and may be implemented as part of the downstream channel wall.

Decomposition of Methane Hydrates

Scientists believe that there could be more valuable carbon fuel stored in the vast methane hydrate deposits scattered under the world's seabed, permafrost and arctic ocean than in all of the known reserves of coal, oil and gas put together. Production of methane from hydrates has been made by depressurizing/gasification of the natural gas hydrate (NGH) layer plus the existing well-based technologies.

On the other hand, besides the current LNG-based energy supply system, NGH production and utilization systems are also believed to be a new high-efficient means to distribute and utilize energy, especially for small to mid-size markets and small-scale gas suppliers. The known aspects involved in the NGH technology development include: multi-component mixed gas hydrate processing technologies, technologies to remove the heat from NGH formation by utilizing untapped cold energy, technologies to enable continuous cooling and depressurizing NGH, technologies and systems to deliver and use NGH.

From the above two scenarios, a discharge, gasification or depressurize step is required in the NGH production and utilization. Here, depressurization/gasification is also referred to decomposition.

An exemplary controlled NGH decomposition process combined with adsorption function/process (via liquid or solid sorbent) using microchannel technology is disclosed.

Figure 8:
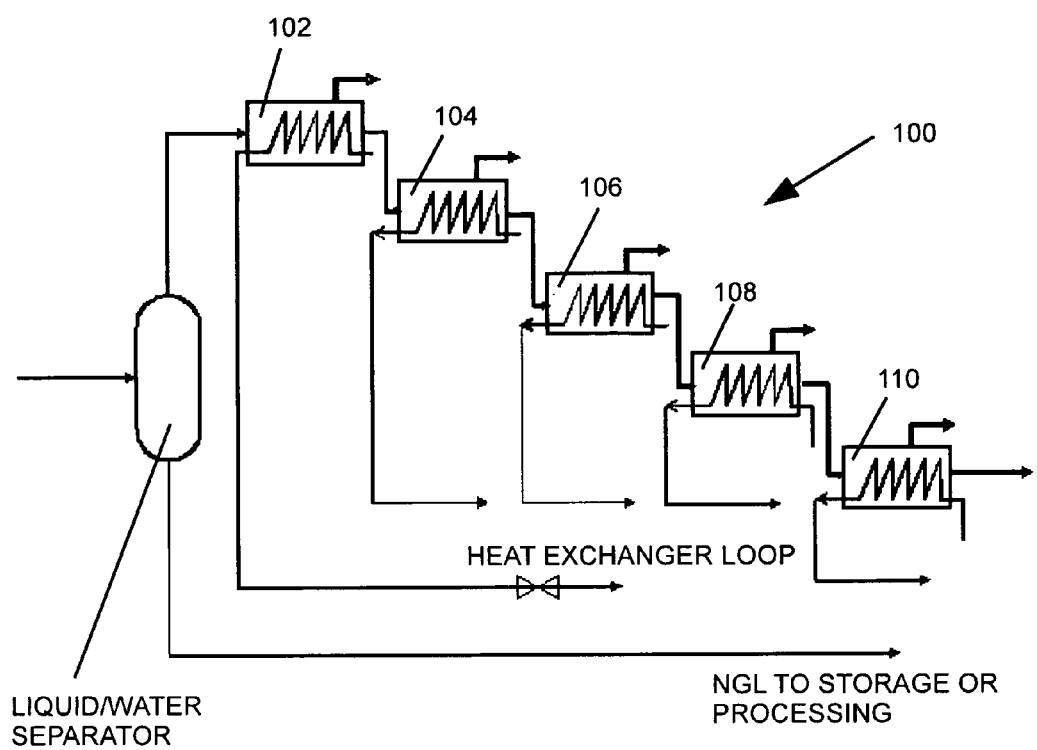
FIG. 8 is a diagram of an exemplary multi-stage integrated system for the capture of hydrocarbons.

The exemplary process is multi-staged. The system 100 includes microchannel adsorption separators 102, 104, 106, 108, 110 named "microchannel adsorbers" in FIG. 8. In each microchannel adsorber 102, 104, 106, 108, different sorbents, including ionic liquids, may be used to achieve maximum removal of the targeted component by making use of the corresponding pressure excursion segment in the overall NGH decomposition process. Valves and other components known to those of skill in the art are not included in FIG. 8 for clarity.

Exploiting Surface Tension Effects for Separations in Microchannel Systems

Inlet Effect and a Micro-Bubble Mixer

One of the directly useful surface tension effects in microchannel separation systems is the history effect of two-phase flow pattern, i.e. the flow or mixing pattern in the inlet of the microchannel process remains for a distance downstream. The reason is that the fluids flow downstream in the time needed to correct the gas-liquid interface shape. This effect fades in the flow direction after a distance. However, a certain distance with a forced flow pattern may be important for mixing and, in turn, in the overall adsorption reaction efficiency between the phases, because the processing microchannel is usually short due to its capacity. As such, the design of an inlet or mixer may be important.

Figure 9:
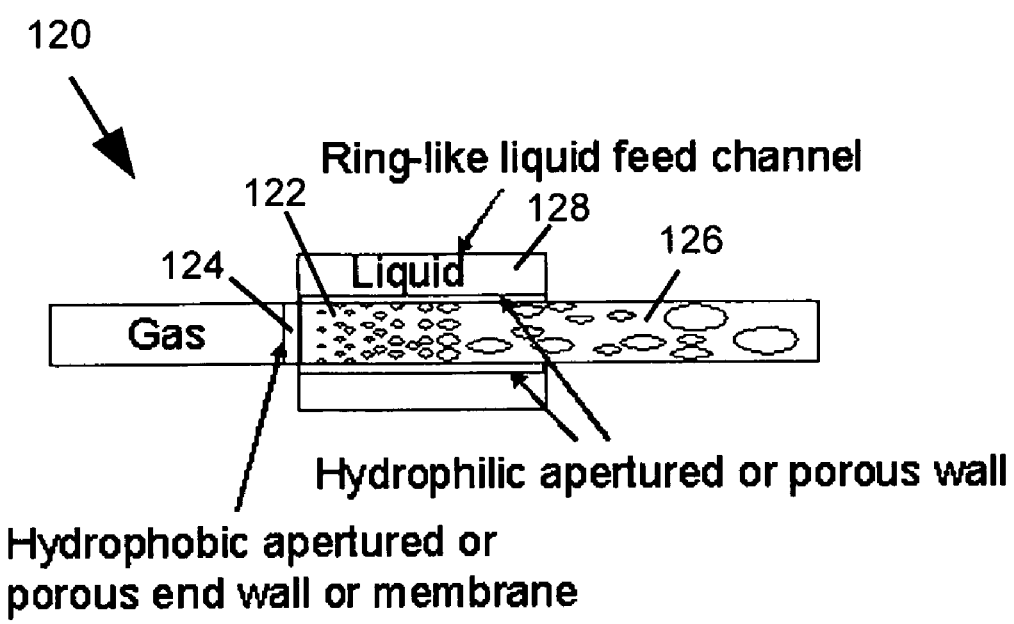
FIG. 9 is a cross-sectional view of an exemplary gas liquid contactor using an apertured substrate.

An exemplary embodiment inlet 120 shown in FIG. 9 may generate "micro bubbles" 122 as the form of the gas feed using a hydrophobic membrane or sieve 124 at the process microchannel inlet. The opening of the membrane or other apertured wall ranges from 1 micrometer to 100 micrometer, for example. The micro-bubbles may coalescence into larger bubbles or slugs 126, but this may occur in the exit. To ensure a uniform phase distribution, the liquid is introduced from the periphery of the channel—an apertured wall. The feed channel 128 may be "ring-like," meaning annular or rectangular cross section depending on cross section shape of process channel, for example.

Figure 10:
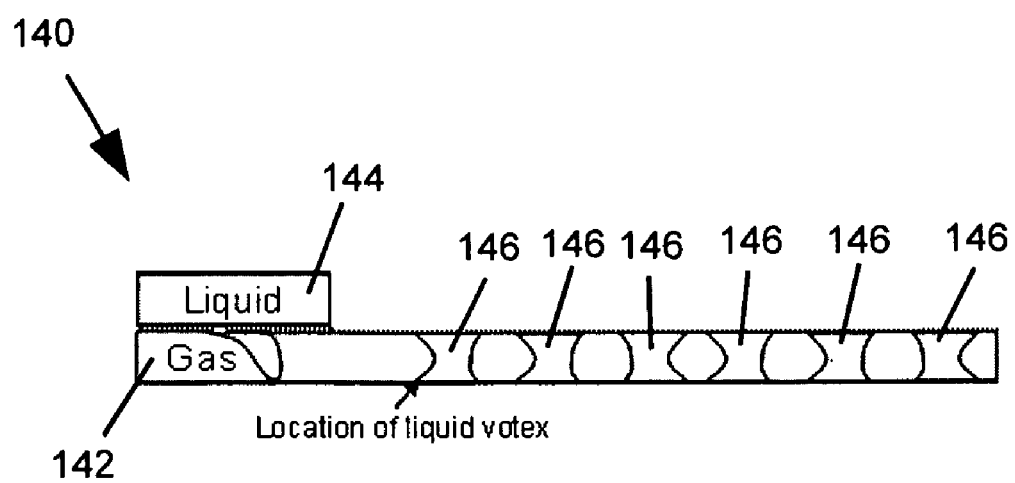
FIG. 10 is a cross-sectional view of an exemplary gas liquid contacting unit.

An exemplary slug type mixer 140 is shown in FIG. 10. It may be used in a microchannel adsorption process using liquid sorbent, when the microchannel gap is small (<1.5 mm). By adjusting the pressure in the gas 142 and liquid 144 feeds, the short liquid slugs 146 can be formed. The contact surface area in the phase interface can be maximized by an optimal slug 146 length. Actually, there will be liquid film underneath the gas slug. And vortices in the tail tips of each liquid slug significantly enhance the mass transfer and in turn the adsorption process.

Minimizing Liquid in Macromanifold

Figure 11:
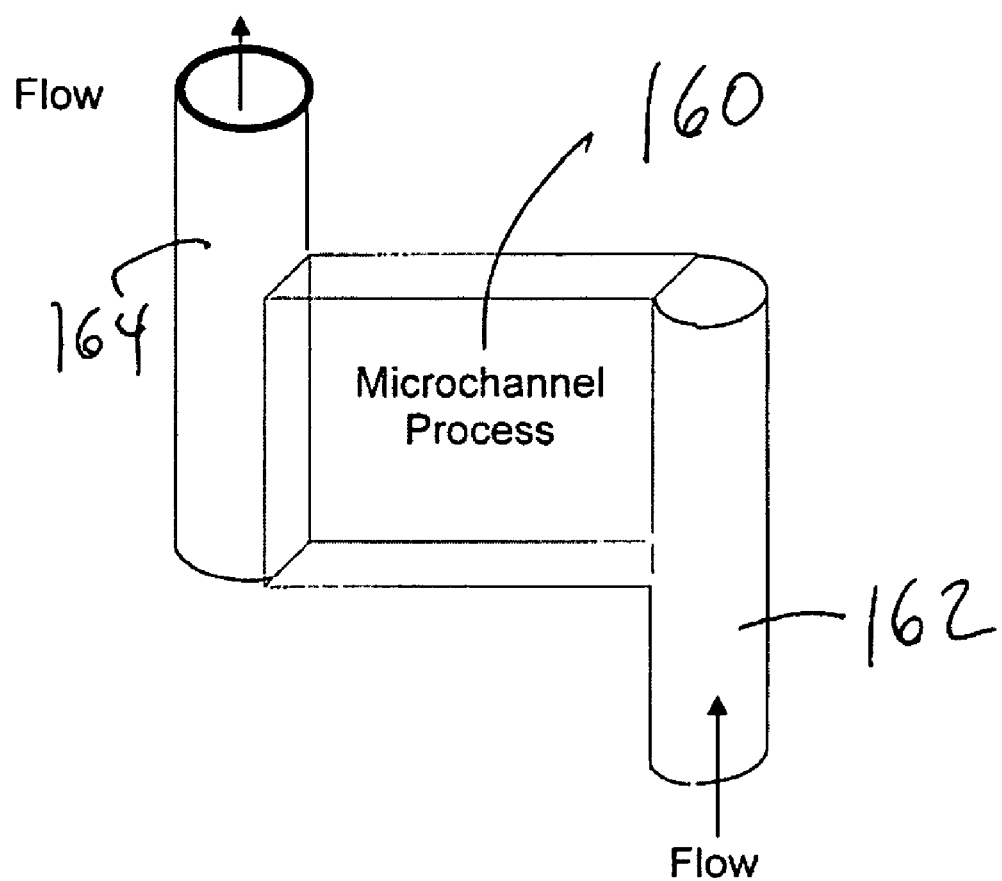
FIG. 11 is an isometric view of an exemplary macromanifold arrangement in a typical microchannel reactor box.
Figure 12:
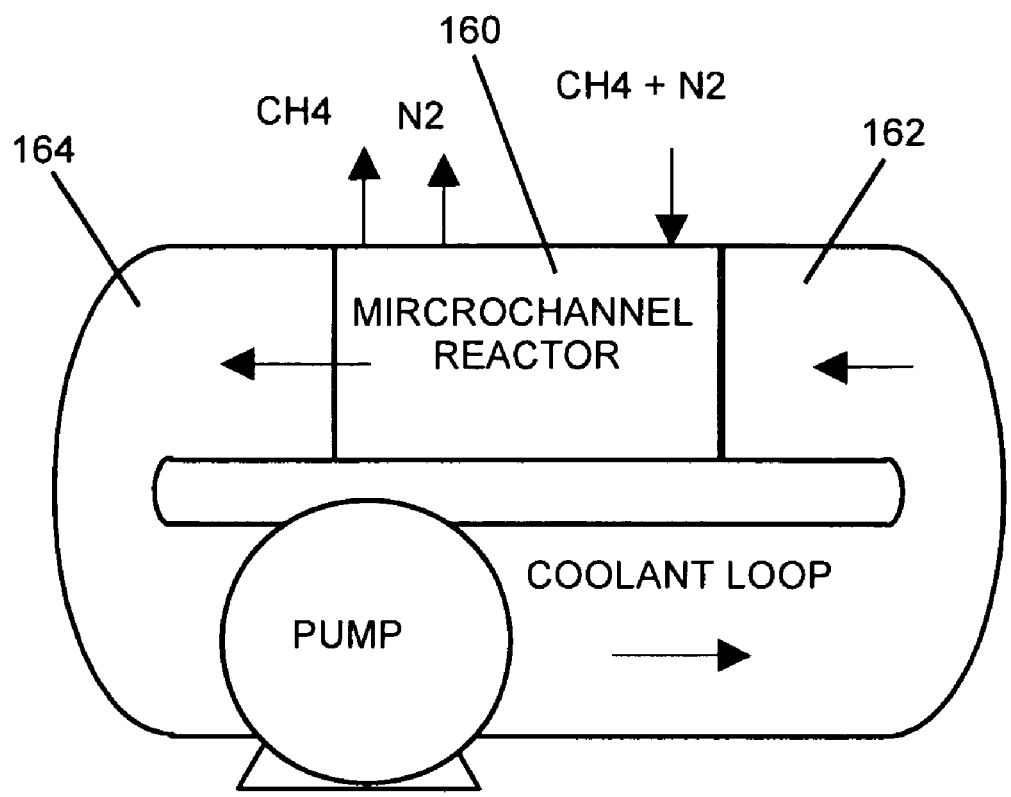
FIG. 12 is a diagram of an exemplary macromanifold arrangement.

For a typical application, a macromanifold design may have a small pressure drop and may be able to distribute flow uniformly among the microchannel openings. Also, a macromanifold for a microchannel reactor device may be designed such that the entire flow rate of the fluid (whether the fluid is a reactant or a heat exchanger fluid) through the reactor can be flowed through the macromanifold. These requirements generally result in use of large size pipes (>1" diameter) as a macromanifold. FIGS. 11 and 12 show a typical microchannel reactor 160 with macromanifold arrangement, including inlet macromanifold 162 and outlet macromanifold 164.

For applications which involve a high cost thermal fluid medium, volume in the macromanifold adds additional cost with no returns since the fluid in the macromanifold does not contribute directly to the productivity. Hence there is always an effort to reduce the total volume of the macromanifold to minimize the total quantity of expensive fluids needed.

For a cylindrical geometry of macromanifold, the volume of manifold is proportional to square of the diameter. If the diameter is reduced by half, the volume of the macromanifold is reduced by 4 times.

Figure 13:
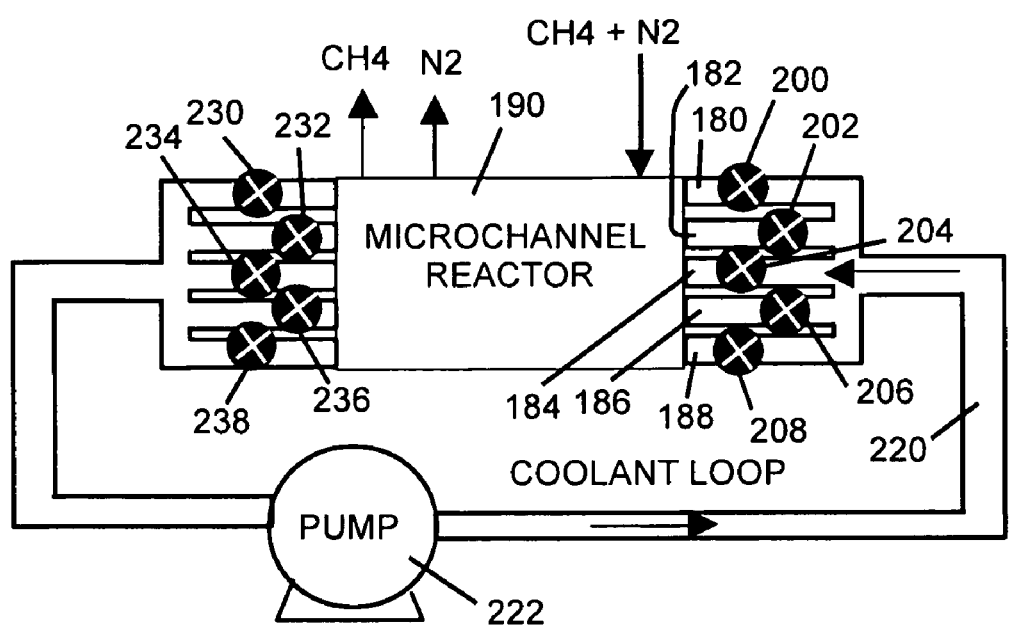
FIG. 13 is a diagram of an exemplary macromanifold arrangement having a reduced macromanifold volume.

For applications like thermal swing absorption, where the temperature of the process channel needs to be cycled between two temperatures and uses a high cost coolant fluid such as ionic liquids, an exemplary approach shown in FIG. 13 may be adopted to minimize the macromanifold size and fluid volume in the macromanifold. The conventional manifold approach (heat exchangers and other equipments excluded) for the coolant loop is shown in FIGS. 11 and 12. The macromanifolds 162, 164 cover the entire faces of the microchannel reactor 160 and the total fluid volume needed in the reactor is circulated through the coolant loop.

In thermal swing absorption cycle, the thermal fluid medium is used to heat and cool the bed. The thermal fluid medium fills the respective channel and stays there to heat or cool the process bed. After the required temperature is achieved, the thermal fluid medium is removed from the channel and the process channel fluid is changed for the next cycle.

FIG. 13 shows a macromanifold approach with smaller volume that can be employed for such process. Instead of one macromanifold, several macromanifolds 180, 182, 184, 186, 188 are connected to the outlet or inlet face of the microchannel reactor 190 that covers different sections of the reactor 190. Each macromanifold 180, 182, 184, 186, 188 has a flow controlling valve 200, 202, 204, 206, 208. All the macromanifolds 180, 182, 184, 186, 188 are then connected to a single pipe 220 which is connected to the pump 222. (Other components such as the heat exchanger, etc. are not shown in FIG. 13.) The valves at the inlet and outlet 230, 232, 234, 236, 238 operate in a cyclical manner. At any time, one or more valves at the inlet and outlet may be closed.

During operation, the thermal fluid medium enters the section of the reactor 190 through macromanifolds 180, 182, 184, 186, 188 with open valves 200, 202, 204, 206, 208 and heats or cools the process wall. While this section of the reactor 190 is heating or cooling, the section of the reactor 190 which already has already reached the required temperature, its outlet valve 230, 232, 234, 236, 238 opens and removes the fluid medium. Once the temperature of the first section reaches the required temperature, its exit valve 230, 232, 234, 236, 238 opens to remove the fluid and the cycle continues. The opening and closing of the valves may be electronically controlled.

At any given time only few exit and inlet valves may be open, so the size of the pipe needed and hence the volume of the fluid needed may be reduced.

Exemplary embodiments may use the momentum of the gas phase coming in to create the momentum in the fluid required to circulate the IL fluid. Embodiments may use gravity (by slanting the device, for example) so the entraining gas pushes the liquid to the high end and gravity helps get it back. In an embodiment, gas may be jetted in the bottom with such a force that it shoves the IL to the top of the circuit and the IL simply falls back on the return.

Figure 14:
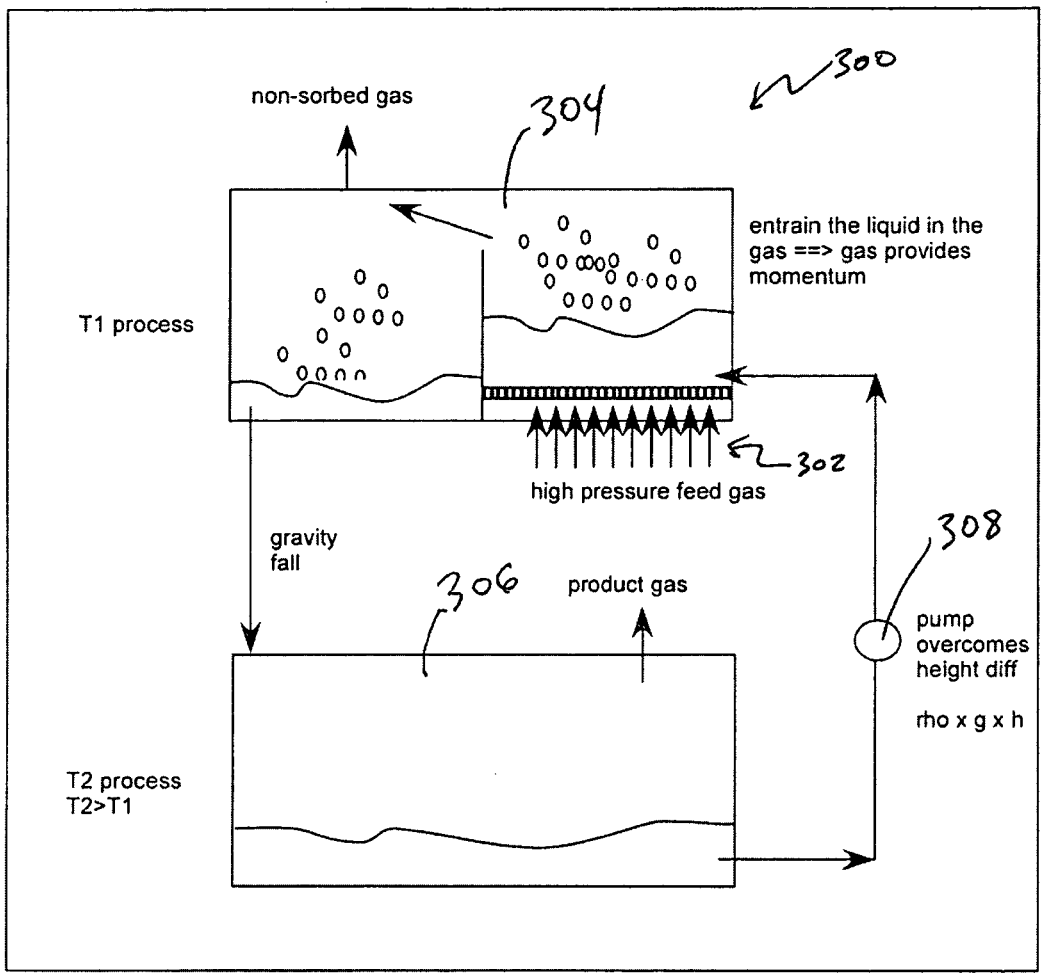
FIG. 14 depicts and exemplary absorption and desorption system

FIG. 14 depicts and exemplary absorption and desorption system 300 where the feed gas 302 is pressurized and provides the momentum to move the absorbent through the absorbent unit 304 operation (whose contact may be effectuated by any of the above aforementioned concepts) and gravity drops the absorbent to the second stage desorption unit 306. At the end of desorption stage a small pump 308 must be provided to raise the absorbent from the lower desorbing 306 unit to the higher absorbing 304 unit to complete the cycle.

In exemplary embodiments, hardware may be fabricated from plastic to help reduce axial conduction and/or alternatively take advantage of hydrophilic/hydrophobic characteristic of the surface to enhance the surface wetting and reduce drag. In an exemplary embodiment, the heat transfer coefficient of the fluid is sufficiently high that the larger resistance to heat transfer is through the intervening wall separating the hot and cold sides of the absorption process. For this case a higher thermal conductivity material such as a metal including nickel, iron, aluminum, copper or other may be utilized with further the optional inclusion of thermal breaks in the axial direction of heat flow.

An exemplary contacting method for absorption of $SO_2$ from flue gas may include a falling film configuration and/or a co-currently flowing system (simultaneously uptaking $CO_2$, as well). [hmim][Tf2N], 1-n-hexyl-3-methylimidazolium bis-(trifluoromethylsulfonyl)imide, may be used as the absorbent. Approximately 1 mol of $SO_2$ can be absorbed by 1 mol of this ionic liquid. Hence, if absorption of all the $SO_2$ from a flue gas stream flowing at 7500 metric tons/day, with a concentration of 0.2% $SO_2$, 20% $CO_2$, the remainder $N_2$, is required, only approximately 7.7 LPM of ionic liquid are required. Although a relatively small falling film system would be required to allow such flow (with a liquid thickness of 0.040" and a 7 ft wide wall (calculated assuming a maximum Reynolds number of 4 to avoid liquid surface rippling, using the derivations in Transport Phenomena, of Bird. B., Stewart, W. E., and Lightfoot, E. N., 1960, pp. 35-41), such a system would not allow the interfacial surface and contact time required to achieve the required mass transfer. Hence, in this particular scenario, the tight contacting allowed in a co-current microchannel flow would be significantly more advantageous.

Figure 15:
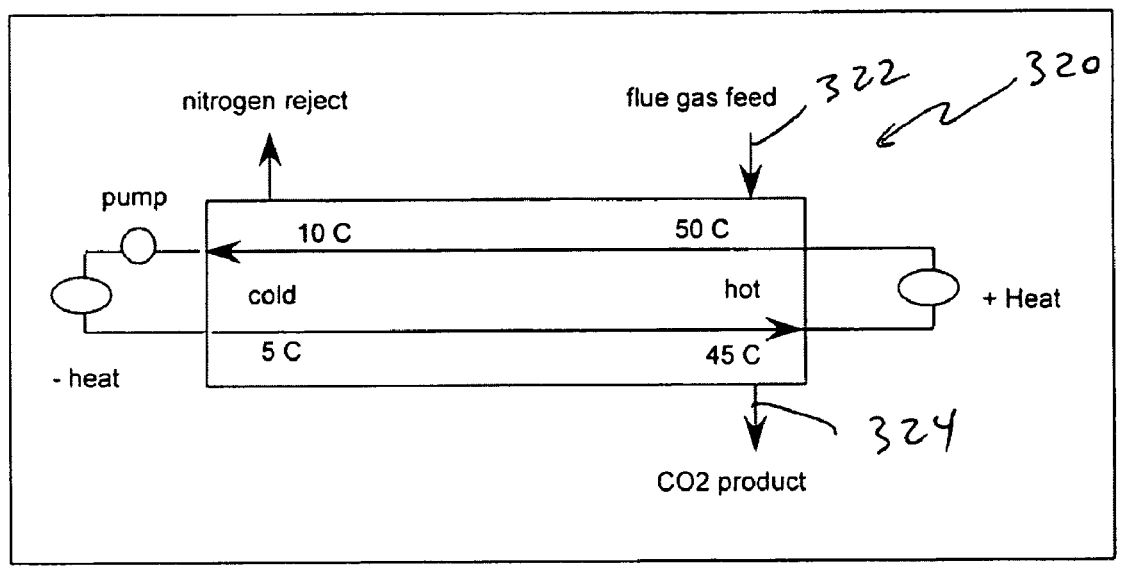
FIG. 15 is a diagram of an exemplary system for removing CO2 from a flue gas feed.

An exemplary separation system 320 to minimize power consumption for the purification of carbon dioxide 324 from a flue gas mixture 322 comprising same is shown in FIG. 15. For the amount of methane absorbed into the ionic liquid BmimPF6 as cited in "Solubilities and Thermodynamic Properties of Gases in the Ionic Liquid 1-n-Butyl-3-methylimidazolium Hexafluorophosphate", Anthony, J., Maginn, E., and Brennecke, J., J. Phys. Chem B 2002, 106, 7315-7320, an exemplary system operates as follows. The Henry's law constant for carbon dioxide at 10 C of roughly 40 bar is used along with the maximum Henry's law constant for nitrogen of 20,000 bar. Using an inlet system pressure of 1.1 bar and a feed gas mixture comprising 13% carbon dioxide, the liquid mole fraction of carbon dioxide at phase equilibrium is 0.024.

For a system with a total flue gas flow rate of 2 billion gms per day which roughly corresponds to a 12 MW power plant and the 13% feed carbon dioxide composition, then the required flow rate of the ionic liquid to recover 90% of the carbon dioxide in the flue gas is roughly 54,000 L/min at equilibrium. The reported molecular weight of this ionic liquid is 284 gm/mole. The reported density is roughly 1.37 gm/cc. The volumetric ratio of liquid to gas is roughly 0.05 at the feed inlet. For alternative ionic liquids with more capacity for carbon dioxide, then the amount of ionic liquid required would reduce roughly proportionally with the reduction in Henry's law constant.

From the reported maximum Henry's law constant for nitrogen, the minimum purity possible in a single stage may be 98.7%. If the actual Henry's law constant is lower than the maximum reported value, then the purity for carbon dioxide in a single stage may be higher than 98.7%.

Purity=($y$CO2/HCO2)/($y$CO2/HCO2+$y$N2/HN2)

where y is the partial pressure of the constituent and H is the Henry's law constant.

For a thermal swing process, energy must be added to the gas-fluid mixture to desorb the carbon dioxide and removed from the fluid to absorb the carbon dioxide. Using an average heat capacity as reported in the literature of 400 J/mol-K and the reported liquid flow rates then the amount of energy added will be a function of the degree of thermal recuperation. Table 2 includes the parasitic thermal energy required to drive the absorption and desorption unit operations as a function of the heat exchange approach temperature.

TABLE 2

| dT in C (approach at each end) | Q-heat (MW) | Q-cool (MW) | Q total (MW) |
| --- | --- | --- | --- |
| 10 | 17.3 | 17.3 | 34.6 |
| 5 | 8.7 | 8.7 | 17.4 |
| 2 | 3.7 | 3.7 | 7.4 |
| 1 | 1.7 | 1.7 | 3.4 |
| 0.5 | 0.87 | 0.87 | 1.74 |
| 0.1 | 0.17 | 0.17 | 0.35 |

As shown in Table 2, as the approach temperature is improved at each end of the unit, the total amount of energy required to drive the system is reduced. An exemplary process is operated with approach temperatures less than 10 C to remove the heat, or add the heat to the ionic liquid, or both. Another exemplary process may have approach temperatures less than 5 C. Another exemplary process may have approach temperatures below 2 C and in some embodiments less than 0.5 C. In one case, the approach temperature at one or both ends may range from 0.05 C to 0.5 C.

As seen in Table 2, for an approach temperature of 0.5 C the thermal parasitic power loss is roughly 15%. As the approach temperature is dropped below 0.3 C, the parasitic thermal power loss drops below 10% of the power plant energy requirement. For an exemplary system with an approach temperature of 0.1 C, then the parasitic power loss is less than 3%.

The absorption process for carbon dioxide releases heat, roughly 16 kJ/mol of carbon dioxide for the exemplary ionic liquid. For this separation and the moles of carbon dioxide absorbed, roughly 1.61 MW of energy will be released during absorption. Using the heat capacity of the ionic liquid, this roughly equates to less than a 0.14 C temperature rise in the fluid.

In another exemplary embodiment reducing the energy consumption when taking into account the heat of absorption, an ionic liquid with a higher capacity may be used. Alternatively, heat rejection to ambient for part of the cycle may be used to avoid the need for energy consumption from a chiller or other cooling source.

Figure 16:
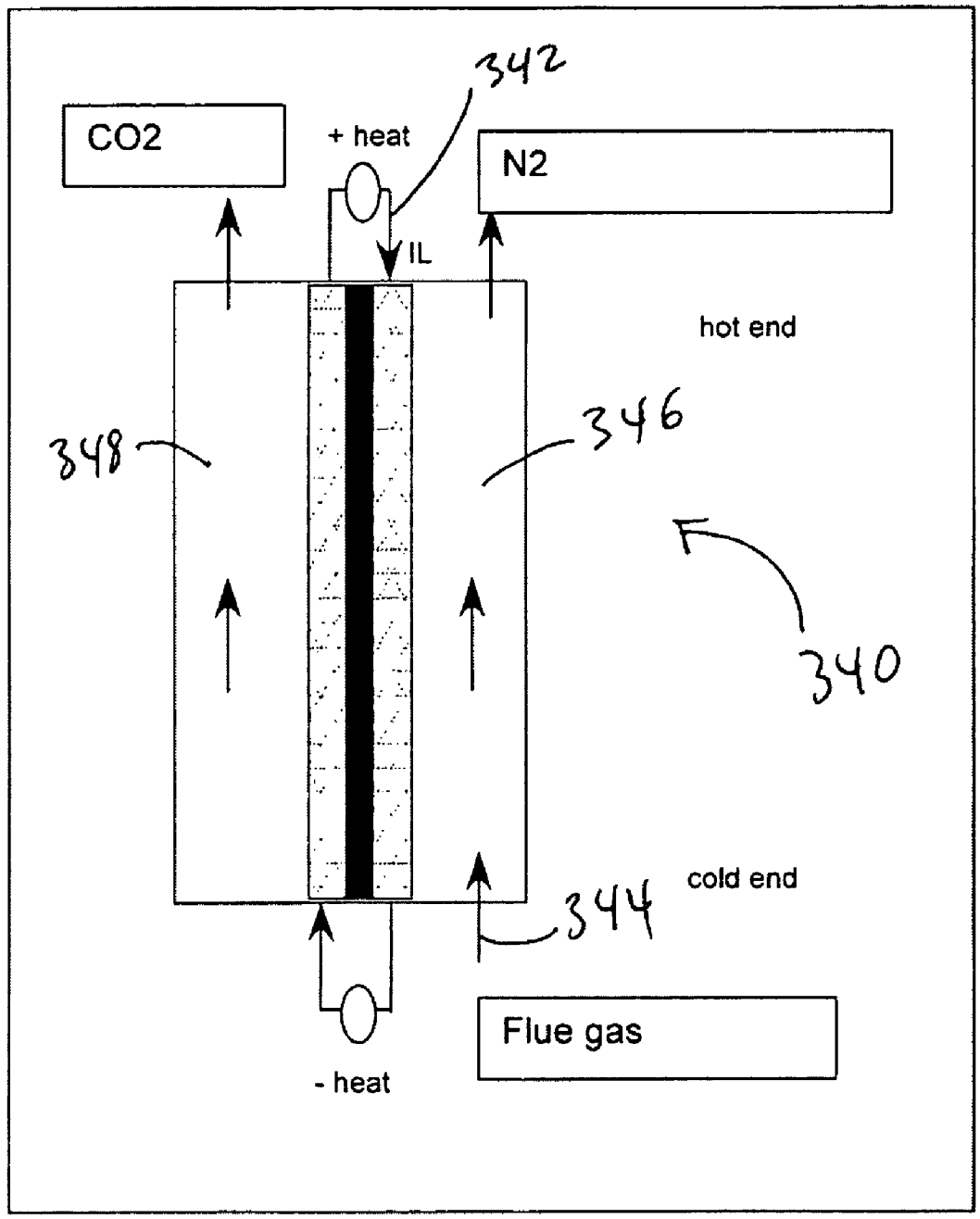
FIG. 16 is a diagram of an exemplary integrated absorption desorption system in a single block to recuperate heat from the two half cycles to reduce the overall parasitic power loss.
Figure 17:
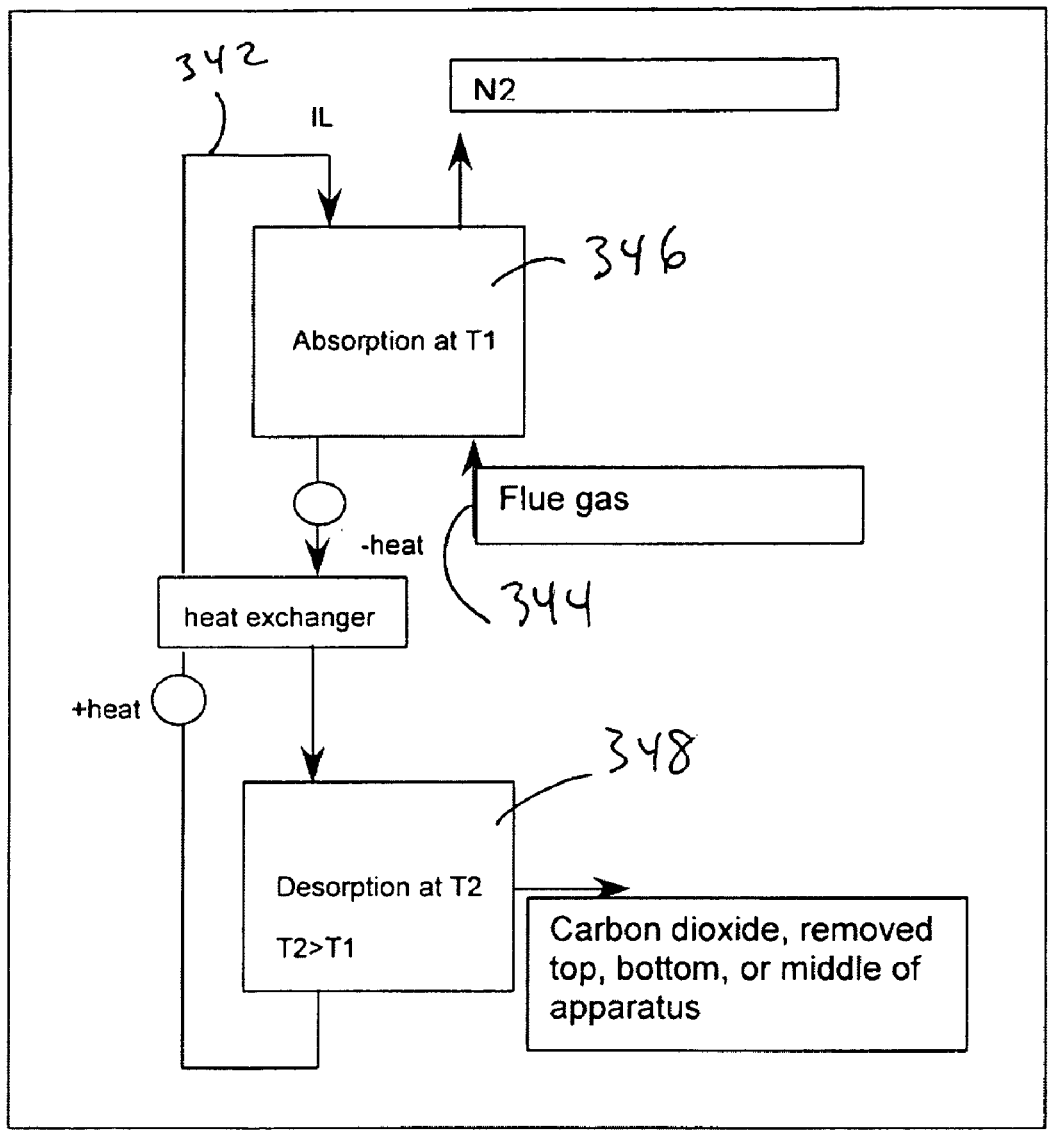
FIG. 17 is a diagram of an exemplary system for efficiently transferring energy between absorption and desorption cycles to reduce parasitic power use.

In an alternative exemplary embodiment, a multi-stage absorption system 340 includes counterflow of an ionic liquid 342 and the feed gas 344 enables the use of a reduced volume of the ionic liquid absorbent. The heat is recuperated between hot and cold devices or ends of a device as shown in FIG. 16. The recuperation of heat reduces the amount of parasitic energy loss for an advantaged system. The further advantage of the counterflow absorption system is the enablement of multiple stages for separation which reduces the inventory required of the ionic liquid. This approach may include contacting of the two phases in a counterflow mode. The absorber 346 and desorber 348 unit may be separate unit operations as shown in FIG. 17 or integrated in a single unit operation or block as shown in FIG. 16.

Figure 18:
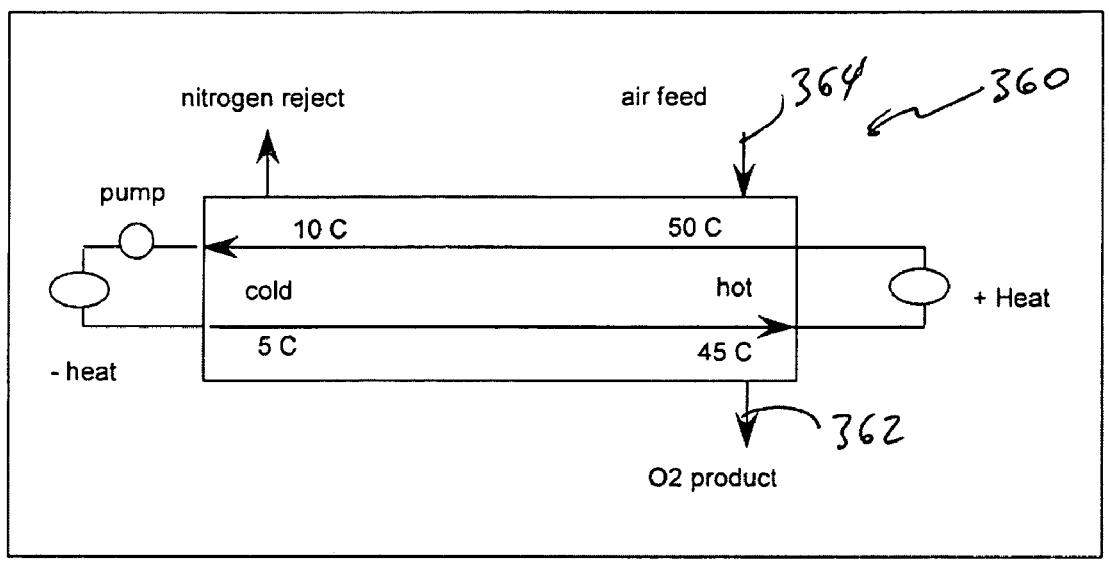
FIG. 18 is a diagram of an exemplary separation system for the purification of oxygen from air.

An exemplary separation system 360 to minimize power consumption for the purification of oxygen 362 from air 364 is shown in FIG. 18. The reported Henry's law constant for oxygen at 50 C of roughly 1550 bar is used along with the maximum Henry's law constant for nitrogen of 20,000 bar. Using an inlet system pressure of 2 bar and a feed gas mixture comprising 21% oxygen (essentially air), the liquid mole fraction of oxygen at phase equilibrium is 0.0035 assuming that roughly 50% of oxygen is captured.

For a system with a total air flow rate of 1000 standard cubic feet per day as a basis, then the required flow rate of the BmimPF6 ionic liquid discussed from the literature cited parameters to recover 50% of the oxygen from the air gas is roughly 5.5 L/min at equilibrium. For this equilibrium case roughly 2.1 L/min of oxygen is captured in the ionic liquid. The reported molecular weight of this ionic liquid is 284 gm/mole. The reported density is roughly 1.37 gm/cc. The volumetric ratio of liquid to gas is roughly 0.28 at the feed inlet. For alternative ionic liquids with more capacity for oxygen over that reported in this example, then the amount of ionic liquid required would reduce roughly proportionally with the reduction in Henry's law constant.

From the reported maximum Henry's law constant for nitrogen, the minimum purity possible in a single stage may be 77.1%. If the actual Henry's law constant is lower than the maximum reported value, then the purity for carbon dioxide in a single stage may be higher than 77%. The nitrogen Henry's law constant is reported at non-detect or a minimum value of 20,000 bar. If the actual constant were 40,000 bar, then for the same case a single stage purity would exceed 87%. If the constant were greater than 80,000 then the purity for a single stage pass would exceed 93%. For a purity of 99% oxygen, the actual Henry's law constant for nitrogen would need to be greater than 580,000 bar.

$$\text{Purity} = (yO2/HO2)/(yO2/HO2 + yN2/HN2)$$

where y is the partial pressure of the constituent and H is the Henry's law constant.

For a thermal swing process, energy must be added to the gas-fluid mixture to desorb the carbon dioxide and removed from the fluid to absorb the oxygen. Using an average heat capacity as reported in the literature of 400 J/mol-K and the reported liquid flow rates then the amount of energy added will be a function of the degree of thermal recuperation. Table 3 lists the parasitic thermal energy required to drive the absorption and desorption unit operations as a function of the heat exchange approach temperature based on an improved ionic liquid with a 3 times reduction in Henry's law constant over that reported for oxygen at 50 C in BmimPF6.

TABLE 3

| dT in C (approach at each end) | Q-heat (kW) | Q-cool (kW) | Q total (KW) | Specific energy (kW-hr/ton O2) |
|---|---|---|---|---|
| 10 | 1.7 | 1.7 | 3.4 | 18120 |
| 5 | 0.88 | 0.88 | 1.76 | 9061 |
| 2 | 0.35 | 0.35 | 0.7 | 3624 |
| 1 | 0.18 | 0.18 | 0.36 | 1812 |
| 0.5 | 0.09 | 0.09 | 0.18 | 906 |
| 0.1 | 0.02 | 0.018 | 0.04 | 181 |

As shown in Table 3, as the approach temperature is improved at each end of the unit, the total amount of energy required to drive the system is reduced. An exemplary process is operated with approach temperatures less than 10 C to remove the heat, or add the heat to the ionic liquid, or both. Another exemplary process will have approach temperatures less than 5 C. Another exemplary process may have approach temperatures below 2 C and in some embodiments less than 0.5 C. In one case, the approach temperature at one or both ends may range from 0.05 C to 0.5 C.

The specific power for oxygen separation using cryogenic separation has been reported as roughly 224 kW-hr/ton. Other sources have noted the specific power requirement for oxygen separation to be comparable and on the order of 250 kW-hr/ton of O2 produced. The numbers cited in the table do not include pumping power but may be offset by the rejection of heat to the atmosphere rather than using a cooling duty. It appears that with an improvement in the Henry's law over that reported for BmimPF6 by a factor of 2 to 5 coupled with a highly efficient thermal process to recuperate heat from absorption and desorption then the specific power to produce oxygen will be less than 1000 kW-hr/ton, more preferably less than 500 kW-hr/ton, and more preferable still less than 250 kW-hr/ton. In one embodiment it may be less than 200 kW-hr/ton and in another between 50 and 250 kW-hr/ton.

The absorption process for oxygen requires heat, roughly 51 kJ/mol of oxygen for the cited ionic liquid. For this separation and the moles of oxygen absorbed roughly 150 W of energy will be consumed during absorption. Using the heat capacity of the ionic liquid, this roughly equates to a 1 C temperature decrease in the fluid. This reported endothermic nature of the absorption of oxygen into the ionic liquid is a further advantage that reduces the cooling duty applied to the ionic liquid and only requires the addition of a small heat source. With the appropriate design of the recuperative heat exchanger, the specific energy required for the thermal process could be reduced in roughly half over that reported in Table 3.

In an alternative exemplary embodiment, a pressure swing process for the separation of oxygen from air uses an ionic liquid or other absorbent. The gas is compressed from 1 bar to 2 bar or more to assist with the absorption of oxygen into the ionic liquid. In some exemplary embodiments, the air is compressed to 5 bar or more to remove oxygen at or above atmospheric pressure to eliminate the need for vacuum desorption process equipment. The compression power is provided at roughly 75% efficiency. The rejected nitrogen will be at a partial pressure of roughly 0.79 times the compressed power in the limiting case of complete oxygen absorption. This pressurized nitrogen stream may be expanded to recover energy to drive the compressor. The expander may be on the order of 60% efficient. The net impact for the system of an integrated compressor and expander is a reduction of more than 30% of the original compressor energy to pressurize the air.

In an exemplary embodiment, maximizing interfacial area may improve effective mass transfer across phases. The use of ionic liquids for preferential absorption of species from a vapor stream is exemplary of the type of process that can benefit from enhancements obtainable by processing on the micro-scale. Because species diffusivity through the liquid phase is relatively low, reduced diffusion thicknesses can have a significant impact on process effectiveness.

In an exemplary process involving absorption of a 1000 sccm pure methane vapor stream into a [hmim][FAP] ionic liquid stream with a Henry's constant of 230 bar/mole fraction, one can expect to be able to absorb 100% of the methane (at room temperature and under a driving force of 10 atm) by flowing the liquid (with a density of 1.56 g/cc) at a flow rate of 268 ccm. For a given set of feed stream compositions, counter-current operation leads to increased driving force for mass transfer, but counter-current flooding limits reduce the window of operation and make processing in co-current mode more flexible and practical.

A rough estimate of co-current and counter-current performance can be made by disregarding the reduction in vapor flow with absorption, assuming liquid-side dominated mass transfer, an overall mass transfer coefficient, $K_L a$, and a pressure drop that are not impacted by flow direction, and the following expression for the rate of species absorption, $r_i$, $$r_i = K_L a (C_i^* - C_i)_{log\ mean}$$

where $C_i^*$ and $C_i$ are the absorbed species concentrations at the liquid interface and in the bulk, respectively. The log mean values relate to the differences at the liquid inlet and outlet ports.

For a 10 atm driving force, a 0.7 atm pressure drop along the liquid flow direction, a 0.8 absorption efficiency (ratio of the absorbed species concentration in the liquid at the exit port to the maximum achievable absorbed species concentration in the liquid), counter-current operation leads to twice the driving force of co-current operation. The less than order of magnitude enhancement and the decreased capacity of counter-current operation may warrant the adoption of co-current flow in some embodiments.

A significant reduction in pressure drop can be had relative to processing through packed beds by using a foam. Because of their relatively high pure fluid viscosity, ionic liquid processing stands to gain from the use of such high porosity, microscale structures that help maximize interaction while minimizing pressure drop and pumping power needs.

In conjunction with ionic liquids, the solid foam approach may be used for carbon sequestration. Some exemplary embodiments allow variable foam stacking lengths, ensuring direct contacting of the cut foams. Because appropriate distribution and interaction of the phases throughout the flow path may be contingent on appropriate feed configurations, vapor and liquid entrance ports may be incorporated to bring the independent streams in direct contact with the beginning of the foam stack. Cylindrical and rectangular process channel configurations allow the use of diverse foam cross sections, to accommodate different foam cutting needs and pore densities. Liquid and vapor feed streams may alternate or intertwine to aid distribution across the whole cross section. Stacks of foams of different porosities, materials, and structures can be incorporated in the same device to provide varying processing effects. Readily available foams include aluminum, carbon, copper, nickel, stainless steel, silicon carbide, among others. Good wetting of the foam by the liquid stream is important to effective performance. In the case of absorption, the foam may be inert, serving only to facilitate flow and phase distribution. If the devices are to accommodate heterogeneous reactions, foam functionalization can allow for relatively easy catalyst integration and regeneration or replacement.

In an exemplary embodiment, the foams are activated with a catalyst or other agent that acts upon the solutes sorbed in the liquid wetted to the activated foam structure. This embodiment would allow more time for a reactive solute to interact with the liquid and activated foam or continuous and porous solid than would be enabled if the solute remained in the gaseous phase. The gaseous phase typically has a shorter residence time in the reaction media. In this embodiment, one or more solutes is preferentially sorbed in a liquid over one or more alternate solutes that are not sorbed or much less strongly sorbed in the liquid sorbent phase.

Figure 19:
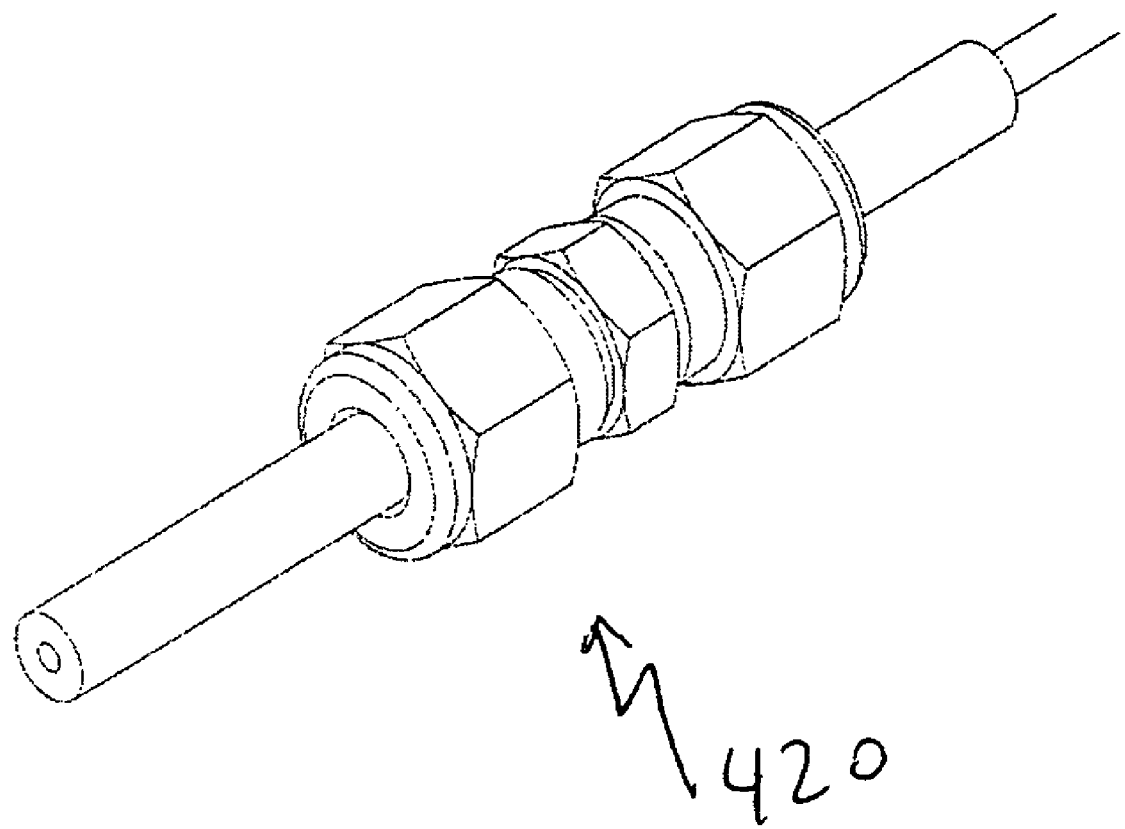
FIG. 19 is an isometric view of an exemplary solid foam processing device.
Figure 20:
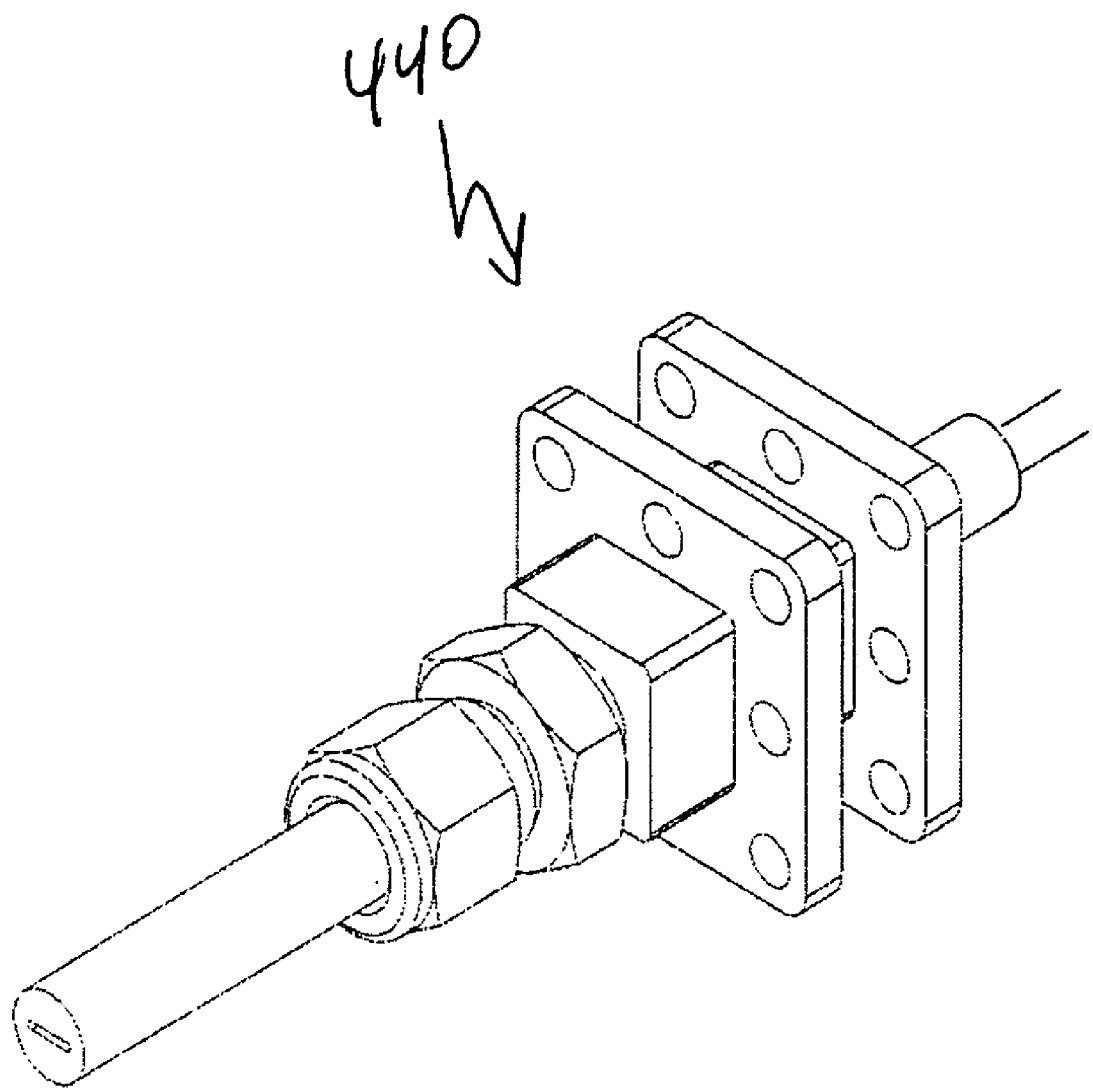
FIG. 20 is an isometric view of an alternative exemplary solid foam processing device.

Two exemplary device configurations, incorporating cylindrical 420 and rectangular 440 flow cross-sections, are shown in FIGS. 19 and 20 and in greater detail in FIGS. 21-26. The depicted exemplary configurations accommodate co-current flows and reflect relatively short foam stacking lengths.

Figure 21:
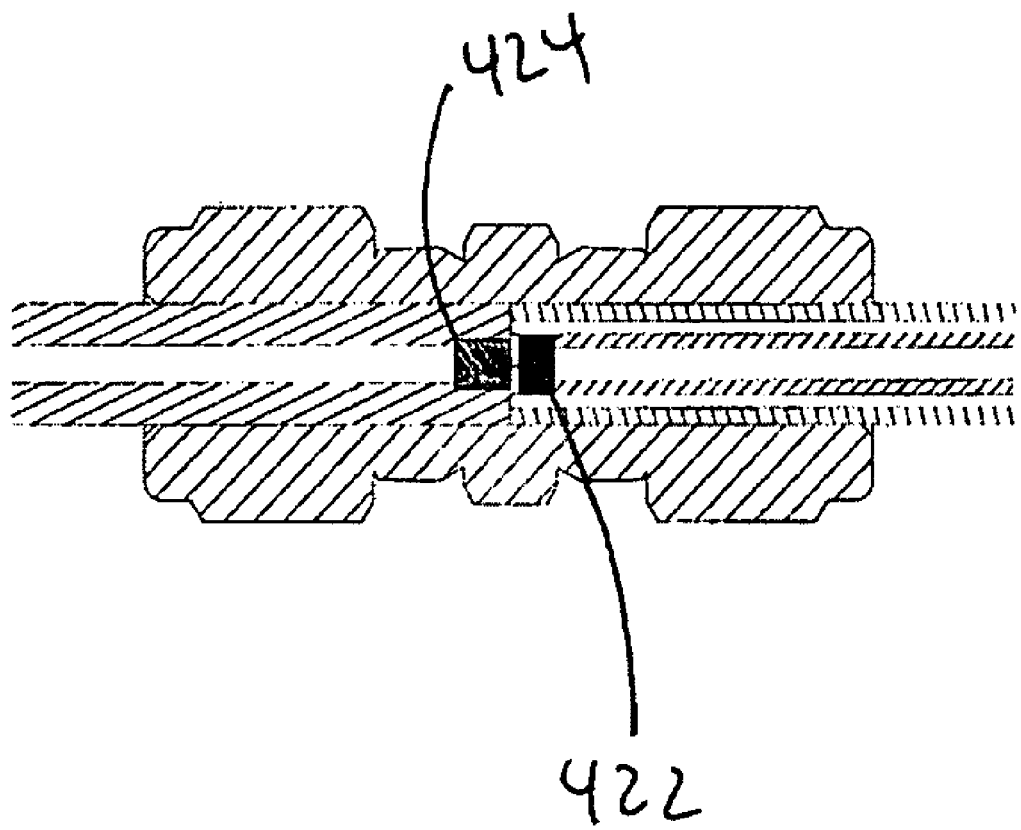
FIG. 21 is a cross-sectional view of an exemplary feed port assembly.
Figure 22:
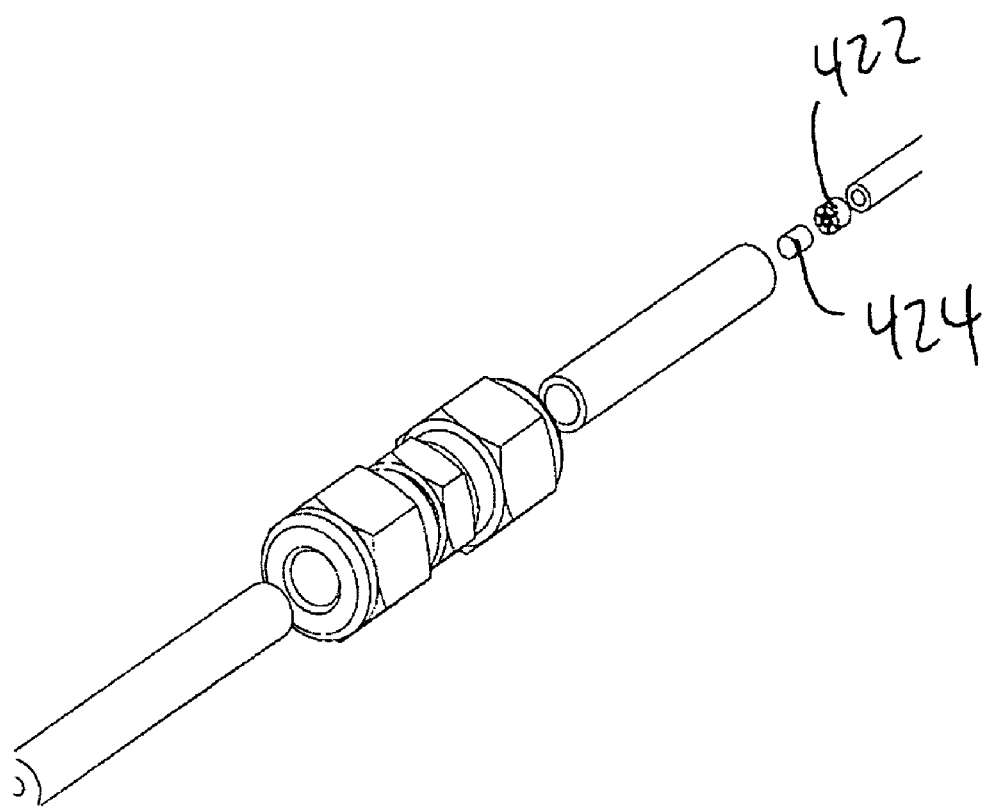
FIG. 22 is an exploded isometric view of an exemplary feed port assembly.
Figure 23:
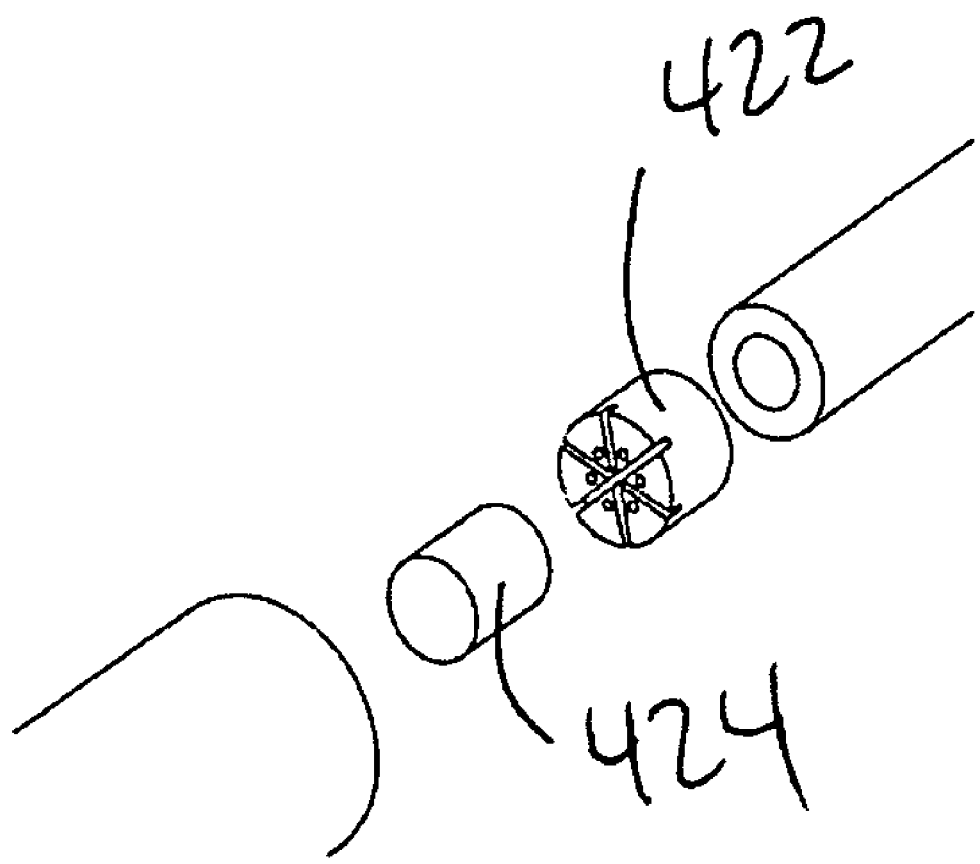
FIG. 23 is an exploded isometric view of an exemplary feed port assembly.

As shown in FIGS. 21-23, a multiphase manifold 422 may be attached upstream of the foam 424 to spread the liquid across the face of the foam 424 and concurrently touch the foam 424 to prevent a head space where two phases may recombine upstream of the foam. This multiphase manifold 422 may improve the uniformity of wetting and distribution of liquid across the surface of the foam 424.

Figure 24:
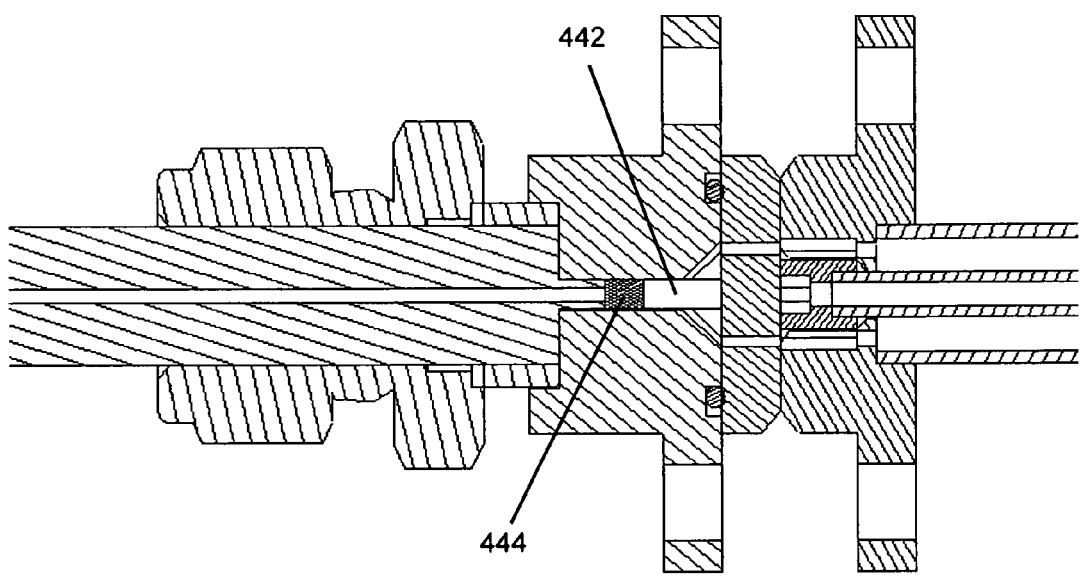
FIG. 24 is a cross-sectional view of an alternative exemplary feed port assembly.
Figure 25:
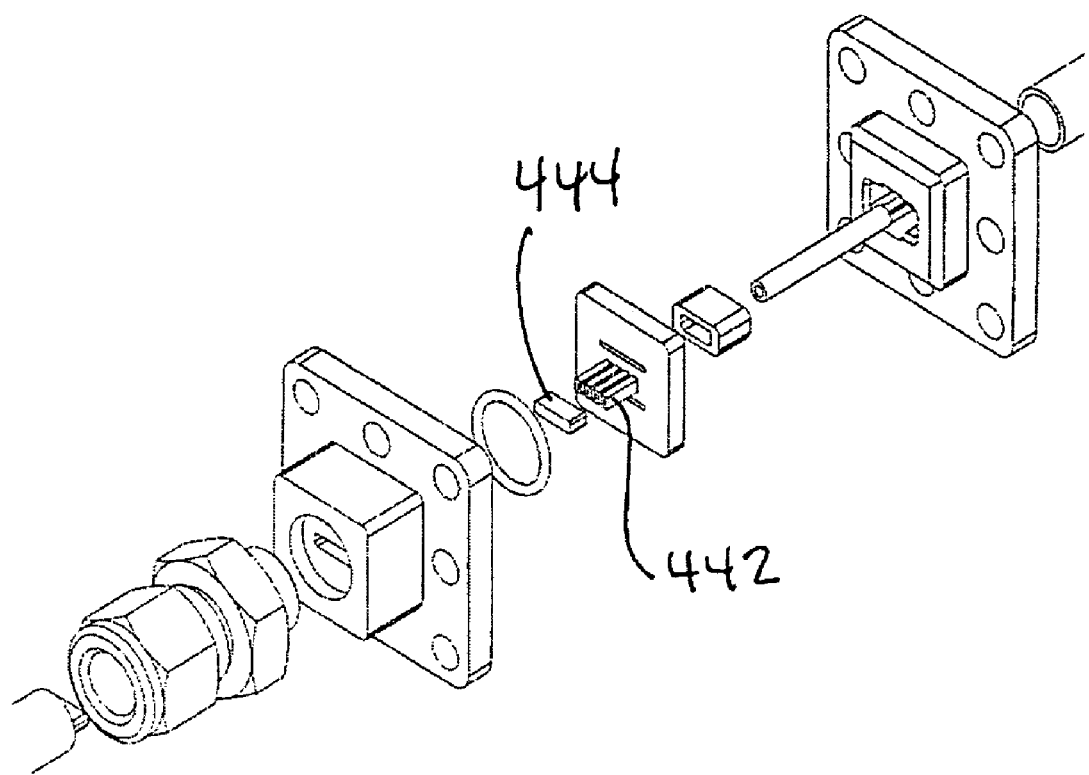
FIG. 25 is an exploded isometric view of an alternative exemplary feed port assembly.
Figure 26:
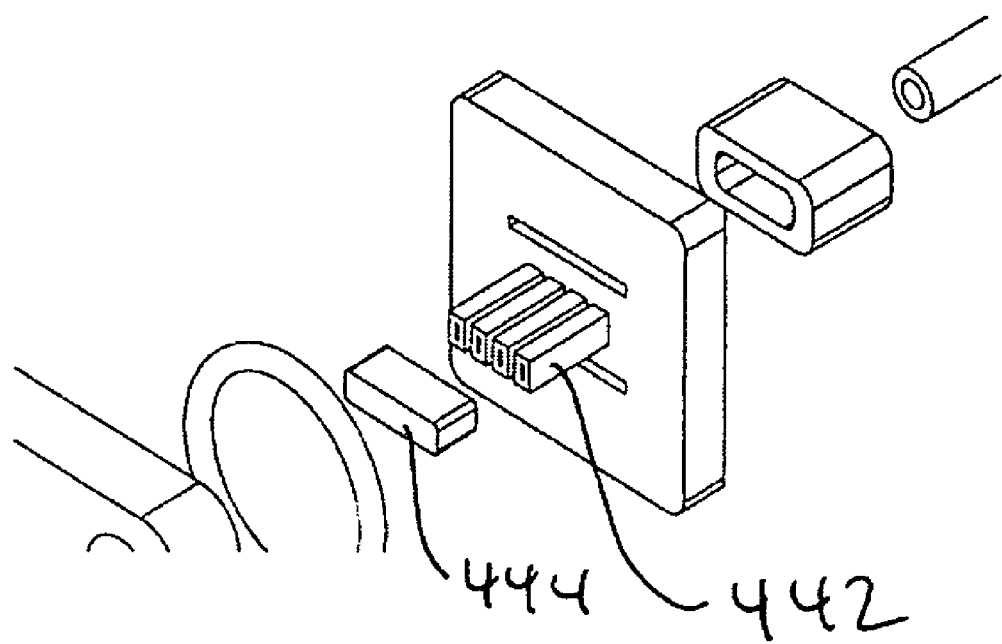
FIG. 26 is a detailed exploded isometric view of an alternative exemplary feed port assembly.

In the multiphase manifold 442 as shown in FIGS. 24-26 the above figure, the gas and liquid fluids are kept separated until they contact the foam 444 or connected porous media substrate. This substantially prevents the two phases from mixing prior to flowing into the connected porous media or foam 144.

Figure 27:
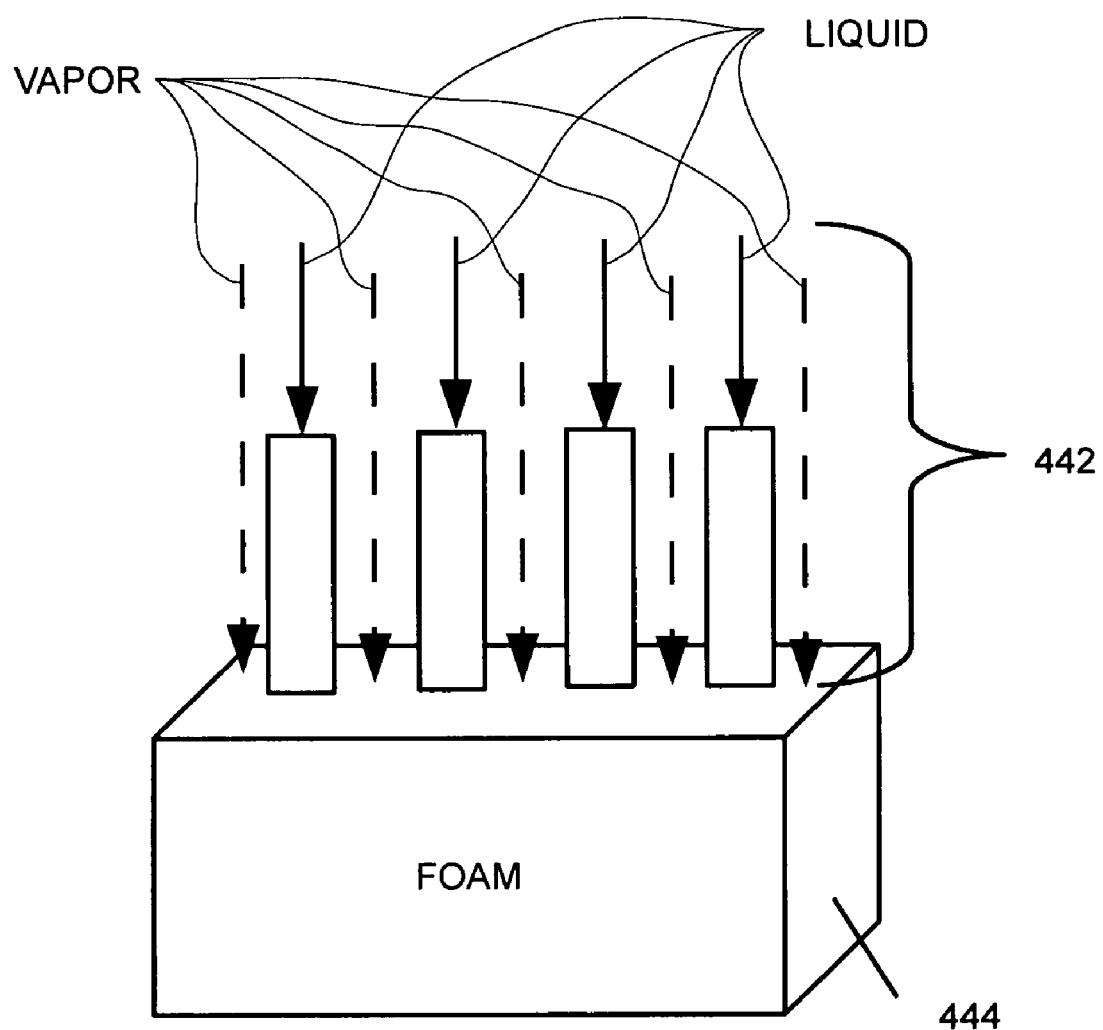
FIG. 27 is a diagram of an exemplary multiphase manifold where the liquid inlet is substantially in contact with the foam or the continuous connected porous media.

FIG. 27 depicts an example of the multiphase manifold 442 where the liquid inlet is substantially in contact with the foam 444 or the continuous connected porous media.

While exemplary embodiments of the invention have been set forth above for the purpose of disclosure, modifications of the disclosed embodiments of the invention as well as other embodiments thereof may occur to those skilled in the art. Accordingly, it is to be understood that the inventions contained herein are not limited to the above precise embodiments and that changes may be made without departing from the scope of the invention. Likewise, it is to be understood that it is not necessary to meet any or all of the stated advantages or objects of the invention disclosed herein to fall within the scope of the invention, since inherent and/or unforeseen advantages of the present invention may exist even though they may not have been explicitly discussed herein. All references mentioned herein are incorporated by reference.

What is claimed is:

1. A method of operating a processing system comprising:
providing a first microchannel including a first absorbent inlet, a first absorbent outlet, a feed stream inlet, and a first resultant gas outlet;
providing a second microchannel including a second absorbent inlet, a second absorbent outlet, and a second resultant gas outlet, the second microchannel being arranged in a counterflow arrangement relative to the first microchannel;
circulating an absorbent through the first microchannel and the second microchannel;
receiving a flue gas feed including nitrogen and carbon dioxide through the feed stream inlet;
exhausting, from the first resultant gas outlet, a first resultant gas having a higher concentration of nitrogen than the flue gas feed; and,
exhausting, from the second resultant gas outlet, a second resultant gas having a higher concentration of carbon dioxide than the flue gas feed;
wherein the absorbent has a temperature T1 at the first inlet, a temperature T2 at the first outlet, a temperature T3 at the second inlet, and a temperature T4 at the second outlet; and,
wherein at least one of the following conditions is satisfied: T2 is greater than T3 and T1 is greater than T4.

2. A method of operating a processing system comprising:
providing a first microchannel including a first absorbent inlet, a first absorbent outlet, a feed stream inlet, and a first resultant gas outlet;
providing a second microchannel including a second absorbent inlet, a second absorbent outlet, and a second resultant gas outlet, the second microchannel being arranged in a counter flow arrangement relative to the first microchannel;

circulating an absorbent through the first microchannel and the second microchannel;

receiving a mixture including at least one hydrocarbon and nitrogen through the feed stream inlet;

exhausting, from the first resultant gas outlet, a first resultant gas having a higher concentration of nitrogen than the mixture; and, exhausting, from the second resultant gas outlet, a second resultant gas having a higher concentration of the at least one hydrocarbon than the mixture;

wherein the absorbent has a temperature T1 at the first inlet, a temperature T2 and the first outlet, a temperature T3 at the second inlet, and a temperature T4 at the second outlet; and, wherein at least one of the following conditions is satisfied: T2 is greater than T3 and T1 is greater than T4.

3. A method of operating a processing system comprising:

providing a first microchannel including a first absorbent inlet, a first absorbent outlet, a feed stream inlet, and a first resultant gas outlet;

providing a second microchannel including a second absorbent inlet, a second absorbent outlet, and a second resultant gas outlet, the second microchannel being arranged in a counterflow arrangement relative to the first microchannel; and circulating an absorbent through the first microchannel and the second microchannel;

receiving a mixture including at least one hydrocarbon and at least one contaminant through the feed stream inlet;

exhausting, from the first resultant gas outlet, a first resultant gas having a higher concentration of the hydrocarbon than the mixture; and exhausting, from the second resultant gas outlet, a second resultant gas having a higher concentration of the contaminant than the mixture;

wherein the absorbent has a temperature T1 at the first inlet, a temperature T2 at the first outlet, a temperature T3 at the second inlet, and a temperature T4 at the second outlet; and, wherein at least one of the following conditions is satisfied: T2 is greater than T3 and T1 is greater than T4.

4. The method of claim 3, wherein the mixture is a natural gas feed and the contaminant is at least one of $H_2S$, a thiol, and another sulfur-containing compound.

5. The method of claim 3, further comprising the act of providing a first Fischer-Tropsch reactor, where the feed stream inlet is coupled to an outlet of the Fischer-Tropsch reactor.

6. The method of 5, further comprising the act of providing a second Fischer-Tropsch reactor, wherein at least one of the first resultant gas outlet and the second resultant gas outlet is coupled to an inlet of the second Fischer-Tropsch reactor.

7. A method of operating a processing system comprising:

providing a first microchannel including a first absorbent inlet, a first absorbent outlet, a feed stream inlet, and a first resultant gas outlet;

providing a second microchannel including a second absorbent inlet, a second absorbent outlet, and a second resultant gas outlet, the second microchannel being arranged in a counterflow arrangement relative to the first microchannel;

circulating an absorbent through the first microchannel and the second microchannel;

receiving a mixture including nitrogen and oxygen through the feed stream inlet;

exhausting, from the first resultant gas outlet, a first resultant gas having a higher concentration of nitrogen than the mixture; and, exhausting, from the second resultant gas outlet, a second resultant gas having a higher concentration of oxygen than the mixture;

wherein the absorbent has a temperature T1 at the first inlet, a temperature T2 at the first outlet, a temperature T3 at the second inlet, and a temperature T4 at the second outlet; and, wherein at least one of the following conditions is satisfied: T3 is greater than T2, T4 is greater than T1, and T2 is greater than T4.

8. A method of operating a processing system comprising:

providing a first microchannel including a first absorbent inlet, a first absorbent outlet, a feed stream inlet, and a first resultant gas outlet;

providing a second microchannel including a second absorbent inlet, a second absorbent outlet, and a second resultant gas outlet, the second microchannel being arranged in a counterflow arrangement relative to the first microchannel;

circulating an absorbent through the first microchannel and the second microchannel;

receiving a mixture including at least one hydrocarbon and at least one contaminant through the feed stream inlet;

exhausting, from the first resultant gas outlet, a first resultant gas having a higher concentration of the hydrocarbon than the mixture; and, exhausting, from the second resultant gas outlet, a second resultant gas having a higher concentration of the contaminant than the mixture;

wherein the absorbent has a temperature T1 at the first inlet, a temperature T2 at the first outlet, a temperature T3 at the second inlet, and a temperature T4 at the second outlet; and, wherein at least one of the following conditions is satisfied: T3 is greater than T2, T4 is greater than T1, and T2 is greater than T4.

9. The method of claim 8, wherein the mixture is a natural gas feed and the contaminant is at least one of $H_2S$, a thiol, and another sulfur-containing compound.

10. The method of claim 8, further comprising the act of providing a first Fischer-Tropsch reactor, where the feed stream inlet is coupled to an outlet of the Fischer-Tropsch reactor.

11. The method of 10, further comprising the act of providing a second Fischer-Tropsch reactor, wherein at least one of the first resultant gas outlet and the second resultant gas outlet is coupled to an inlet of the second Fischer-Tropsch reactor.

* * * * *

UNITED STATES PATENT AND TRADEMARK OFFICE
CERTIFICATE OF CORRECTION

PATENT NO. : 8,221,528 B2
APPLICATION NO. : 12/184877
DATED : July 17, 2012
INVENTOR(S) : Anna Lee Y. Tonkovich et al.

It is certified that error appears in the above-identified patent and that said Letters Patent is hereby corrected as shown below:

On the Title Page, left hand column after "Inventors:" change the following inventor name from "Qiu Dongming" to "Dongming Qiu"

Signed and Sealed this
Eleventh Day of September, 2012

David J. Kappos
*Director of the United States Patent and Trademark Office*